(12) United States Patent
Hoshino

(10) Patent No.: US 7,577,919 B2
(45) Date of Patent: Aug. 18, 2009

(54) USER INTERFACE APPARATUS, METHOD, AND COMPUTER READABLE RECORDING MEDIUM FOR INTERACTING WITH CHILD WINDOWS IN AN APPLICATION WINDOW

(75) Inventor: Masaru Hoshino, Nagano-Ken (JP)

(73) Assignee: Seiko Epson Corporation, Nagano-ken (JP)

( * ) Notice: Subject to any disclaimer, the term of this patent is extended or adjusted under 35 U.S.C. 154(b) by 315 days.

(21) Appl. No.: 11/390,166

(22) Filed: Mar. 28, 2006

(65) Prior Publication Data

US 2006/0215226 A1 Sep. 28, 2006

(30) Foreign Application Priority Data

| Mar. 28, 2005 | (JP) | ............................. 2005-093206 |
| Mar. 30, 2005 | (JP) | ............................. 2005-099783 |
| Mar. 30, 2005 | (JP) | ............................. 2005-099784 |

(51) Int. Cl.
*G06F 3/048* (2006.01)

(52) U.S. Cl. ................. 715/781; 715/200; 715/274; 715/788; 715/792; 715/817; 715/825

(58) Field of Classification Search ............. 715/792, 715/817, 825, 200, 274, 781, 788
See application file for complete search history.

(56) References Cited

U.S. PATENT DOCUMENTS

| 5,712,995 | A | * | 1/1998 | Cohn | ........................ 715/792 |
| 6,008,809 | A | * | 12/1999 | Brooks | ........................ 715/792 |
| 6,301,586 | B1 | * | 10/2001 | Yang et al. | ............... 707/104.1 |
| 6,453,078 | B2 | * | 9/2002 | Bubie et al. | .................. 382/305 |
| 2003/0147097 | A1 | * | 8/2003 | Kotani et al. | ............... 358/1.18 |
| 2005/0022136 | A1 | | 1/2005 | Hatscher et al. | |

FOREIGN PATENT DOCUMENTS

| JP | 2001-350467 A | 12/2001 |
| JP | 2002-133432 A | 5/2002 |
| JP | 2003-263256 A | 9/2003 |
| JP | 2004-117571 A | 4/2004 |
| JP | 2004-342115 A | 12/2004 |

* cited by examiner

*Primary Examiner*—Weilun Lo
*Assistant Examiner*—Tuyetlien T Tran
(74) *Attorney, Agent, or Firm*—Sughrue Mion, PLLC

(57) ABSTRACT

To cause a user to recognize the workflow in an image processing. A display apparatus for the user interface of an image processing application having a browse processing for displaying image information, a layout processing for generating layout information by allocating the image information and a print processing for generating printing information to print by a printing device based on the layout information. The display apparatus for the user interface includes an application window display section for displaying an window for the image processing application, and a processing window display section for displaying in the window for the image processing application, an window for the browse processing including displaying the image information, an window for the layout processing including displaying the layout information and an window for the print processing including displaying the printing information.

5 Claims, 33 Drawing Sheets

| PUSHED BUTTON | CURRENT DISPLAY STATE INFORMATION | POST-TRANSITION DISPLAY STATE INFORMATION |
|---|---|---|
| LARGE (S) | 1 | 13 |
| LARGE (S) | 3 | 8 |
| LARGE (S) | 4 | 10 |
| LARGE (T) | 1 | 12 |
| LARGE (T) | 2 | 6 |
| LARGE (T) | 4 | 9 |
| LARGE (U) | 1 | 11 |
| LARGE (U) | 2 | 5 |
| LARGE (U) | 3 | 7 |
| SMALL (S) | 1 | 2 |
| SMALL (S) | 3 | 7 |
| SMALL (S) | 4 | 9 |
| SMALL (T) | 1 | 3 |
| SMALL (T) | 2 | 5 |
| SMALL (T) | 4 | 10 |
| SMALL (U) | 1 | 4 |
| SMALL (U) | 2 | 6 |
| SMALL (U) | 3 | 8 |

| PUSHED BUTTON | CURRENT DISPLAY STATE INFORMATION | POST-TRANSITION DISPLAY STATE INFORMATION |
|---|---|---|
| RETURN (S) | 2 | 1 |
| RETURN (S) | 5 | 2 |
| RETURN (S) | 6 | 2 |
| RETURN (S) | 7 | 3 |
| RETURN (S) | 8 | 3 |
| RETURN (S) | 9 | 4 |
| RETURN (S) | 10 | 4 |
| RETURN (S) | 11 | 1 |
| RETURN (S) | 12 | 1 |
| RETURN (S) | 13 | 1 |
| RETURN (T) | 3 | 1 |
| RETURN (T) | 5 | 2 |
| RETURN (T) | 6 | 2 |
| RETURN (T) | 7 | 3 |
| RETURN (T) | 8 | 3 |

| PUSHED BUTTON | CURRENT DISPLAY STATE INFORMATION | POST-TRANSITION DISPLAY STATE INFORMATION |
|---|---|---|
| RETURN (T) | 9 | 4 |
| RETURN (T) | 10 | 4 |
| RETURN (T) | 11 | 1 |
| RETURN (T) | 12 | 1 |
| RETURN (T) | 13 | 1 |
| RETURN (U) | 4 | 2 |
| RETURN (U) | 5 | 2 |
| RETURN (U) | 6 | 3 |
| RETURN (U) | 7 | 3 |
| RETURN (U) | 8 | 4 |
| RETURN (U) | 9 | 4 |
| RETURN (U) | 10 | 4 |
| RETURN (U) | 11 | 1 |
| RETURN (U) | 12 | 1 |
| RETURN (U) | 13 | 1 |

| DISPLAY STATE NUMBER | SMALL WINDOW DISPLAY STATE ||| BUTTON DISPLAY STATE ||||||||||
|---|---|---|---|---|---|---|---|---|---|---|---|---|
| | | | | S REGION ||| T REGION ||| U REGION |||
| | S REGION | T REGION | U REGION | LARGE (S) | SMALL (S) | RETURN (S) | LARGE (T) | SMALL (T) | RETURN (T) | LARGE (U) | SMALL (U) | RETURN (U) |
| 1 | RATIO p | RATIO q | RATIO r | DIS. | DIS. | – | DIS. | DIS. | – | DIS. | DIS. | – |
| 2 | MIN. | RATIO q | RATIO r | – | – | DIS. | DIS. | DIS. | – | DIS. | DIS. | – |
| 3 | RATIO p | MIN. | RATIO r | DIS. | DIS. | – | – | – | DIS. | DIS. | DIS. | – |
| 4 | RATIO p | RATIO q | MIN. | DIS. | DIS. | – | DIS. | DIS. | – | – | – | DIS. |
| 5 | MIN. | MIN. | MAX. | – | – | DIS. | – | – | DIS. | – | – | DIS. |
| 6 | MIN. | MAX. | MIN. | – | – | DIS. | – | – | DIS. | – | – | DIS. |
| 7 | MIN. | MIN. | MAX. | – | – | DIS. | – | – | DIS. | – | – | DIS. |
| 8 | MAX. | MIN. | MIN. | – | – | DIS. | – | – | DIS. | – | – | DIS. |
| 9 | MIN. | MAX. | MIN. | – | – | DIS. | – | – | DIS. | – | – | DIS. |
| 10 | MAX. | MIN. | MAX. | – | – | DIS. | – | – | DIS. | – | – | DIS. |
| 11 | MIN. | MIN. | MIN. | – | – | DIS. | – | – | DIS. | – | – | DIS. |
| 12 | MIN. | MAX. | MIN. | – | – | DIS. | – | – | DIS. | – | – | DIS. |
| 13 | MAX. | MIN. | MIN. | – | – | DIS. | – | – | DIS. | – | – | DIS. |

NONACCEPTANCE DISPLAY

ACCEPTANCE DISPLAY

USER INTERFACE APPARATUS, METHOD, AND COMPUTER READABLE RECORDING MEDIUM FOR INTERACTING WITH CHILD WINDOWS IN AN APPLICATION WINDOW

CROSS REFERENCE TO RELATED APPLICATION

The present application claims priority from Japanese Patent Applications Nos. JP2005-093206 filed on Mar. 28, 2005, JP2005-099783 filed on Mar. 30, 2005, and JP2005-099784 filed on Mar. 30, 2005, the contents of which are incorporated herein by reference.

BACKGROUND OF THE INVENTION

1. Field of the Invention

The present invention relates to a display apparatus for a user interface, a display method for the user interface and a program. Specifically, the present invention relates to a display apparatus for a user interface of an image processing application for generating printing information from image information, a display method for the user interface and a program. Additionally, the present invention relates to a display apparatus for a user interface for displaying a plurality of small windows in a large window for the whole application, a display method for the user interface and a program.

2. Related Art

Conventionally, an image processing system has been known, for accepting orders of original images from customers, outputting output images based on image information of the original images and delivering the outputted images to the customers, as disclosed in Japanese Patent Application Publication No. 2004-117571. The image processing system accepts order information from an operator using an order entry GUI (graphic user interface) and registers the same.

Additionally, a computer system including a plurality of small windows in a large window displayed on a display screen has been known, as disclosed in Japanese Patent Application Publication No. 2004-342115. In the prior art, the plurality of small windows are displayed under two states such that the small windows are opened (opening state) and the small windows are folded (folded state) in the large windows. Therefore, the user can display the small window with a desired size in the large window.

Further, a display apparatus has been known, which arranges the plurality of windows by stacking them in a predetermined direction according to the hierarchical relationship when a plurality of windows are displayed on a display screen, as disclosed in Japanese Patent Application Publication No. 2003-263256.

However, in the above disclosed image processing system, the order entry GUI registers the orders and controls the same, but image processing such as developing and printing is performed using individual applications. When the image processing system is installed in a photo shop and operated by an operator in the photo shop, the operator and the other staffs in the photo shop understand usage of appropriate applications in the appropriate order in workflow including ordering original images and printing output images in most cases. Meanwhile when an individual user performs image processing by him/herself on image information captured by a digital camera and prints by such as an inkj et printer in the image processing system, it has been difficult for the individual users to understand the workflow and perform the processing according to the workflow to generate print information from image information.

Additionally, in the display apparatus, when a user desires to extend a specified small window to the maximum size and display the same in the large window, the other small windows in the large window should be folded. Particularly, when there are a number of opened small windows in the large window, the user should fold each of the windows other than the specified small window.

Further, in the display apparatus, the windows disposed in the back are displayed only a part thereof during operations. Therefore, it is difficult for the user to correctly know the all windows included in the application.

SUMMARY OF THE INVENTION

To solve the above-described problem, a first aspect of the present invention provides a display apparatus for a user interface of an image processing application for performing a browse processing to display image information, a layout processing to generate layout information by allocating the image information, and a print processing to generate printing information to print by a printing device based on the layout information. The display apparatus includes an application window display section for displaying a window for the image processing application on a display screen, and a processing window display section for displaying a window for the browse processing including displaying the image information, a window for the layout processing including displaying the layout information and a window for the print processing including displaying the printing information in the window of the image processing application on the display screen. Therefore, the process to generate printing information from image information in the image processing application can be clearly presented to the user.

In the display apparatus of the user interface, the browse processing, the layout processing and the print processing are sequentially operated in the described order in the image processing application. The display apparatus for the user interface may flier include a change reflecting section for charging the image information displayed on the window for the layout processing and the window for the print processing when image information is changed. Additionally, in the display apparatus for the user interface, the change reflecting section may change the layout information displayed in the window for the print processing when the layout information is changed in the layout processing. Thereby the user can recognize that the change of the upstream processing affects the downstream processing in the image processing application.

In the display apparatus for the user interface, the change reflecting section may generate a new layout information in the layout processing based on a changed printing information when the printing information is changed in the print processing. Thereby the changed processing can be performed from the upstream without wasting the performed processing in the upstream next time.

In the display apparatus for the user interface, each of the browse processing, the layout processing and the print processing has a subroutine processing. The display apparatus for the user interface may further include a subroutine display section for displaying a new window for the subroutine when the subroutine processing is selected, and for closing the window for the subroutine when the subroutine processing is ended. Even if each of the subroutine processing is performed, the process to generate printing information from image information can be clearly presented to the user.

A second aspect of the present invention provides a display method for a user interface of an image processing application for performing a browse processing to display image information, a layout processing to generate layout processing by allocating the image information and a print processing to generate printing information to print by a printing device based on the layout information. The display method includes the steps of: displaying an window for the image processing application on a display screen; and displaying in the window for the application on the display screen, an window for the browse processing including displaying the image information, an window for the layout processing including displaying the layout information and an window for the pint processing including displaying the printing information. Thereby the effect same as the first aspect can be achieved.

A third aspect of the present invention provides a program for a user interface of an image processing application for performing a browse processing to displaying image information, a layout processing to generate layout processing by allocating the image information and a print processing to generate printing information to print by the printing device based on the layout information. The program causes the computer to operate as an outer-window display function for displaying am window for the image processing application and an inner-window display function for displaying an window for the browse processing including displaying the image information, a window for the layout processing including displaying the layout information and an window for the print processing including displaying the printing information. Thereby the effect same as the first aspect can be achieved.

A fourth aspect of the present invention provides a display apparatus for a user interface. The display apparatus includes: a large window display section for displaying a large window for the whole application on a display screen; a small window display section for arranging three or more small windows in the large window displayed on the display screen in one direction to display the same; a maximization accepting section for accepting an input to maximize any of the three or more small windows; a minimization accepting section for accepting an input to minimize any of the three or more small windows; a maximization display section for minimizing the small windows other than one window in the large window when the maximization accepting section accepts the input to maximize the one small window to cause the small window display section to display the same, and for extending the one window to a space generated by the minimization in the large window to cause the small widow display section to display the same; and a minimization display section for minimizing one small window in the large window to cause the small window to display section to display the same when the minimization accepting section accepts the input to minimize the one small window and for extending at least one of the small windows other than the one window in the large window to a space generated by the minimization to cause the small window display section to display the same. Thereby the small windows can be effectively displayed in the large window.

The maximization display section and the minimization display section may display the three or more small windows as holding the arrangement in one direction when the small windows are minimized and extended. Thereby the user can recognize the position of the small windows in the whole application when the small windows are minimized and extended.

The maximization display section and the minimization display section may reduce the small windows in at least one direction to display the same when the small windows are minimized. Thereby the user can recognize the position of the small windows in the whole application when the small windows are minimized and extended.

The small window display section may display the small windows corresponding to each work in the application. Thereby each work in the application can be effectively displayed.

The display apparatus for a user interface may further include a return accepting section for accepting a input to return after displaying by the maximization display section or the minimization display section, and a return display section for returning the display size of the three or more windows to the original size before the small windows are displayed by the maximization display section or the minimization display section when the return accepting section accepts the input to return. Thereby even if the small windows are maximized and minimize, each window including the small windows can be easily returned to the original state.

A fifth aspect of the present invention provides a display method for a user interface. The display method includes the steps of; displaying a large window for the whole application on a display screen; arranging three or more small windows in the large window displayed on the display screen in one direction to display the same; accepting an input to maximize any of the three or more small windows; accepting an input to minimize any of the three or more small windows; minimizing the small windows other than one window in the large window when the maximization accepting section accepts the input to maximize the one small window to display the same, and extending the one window to a space generated by the minimization in the large window to cause the small widow display section to display the same; and minimizing one small window in the large window to display the same when the minimization accepting section accepts the input to minimize the one small window and for extending at least one of the small windows other than the one window in the large window to a space generated by the minimization to display the same. Thereby the small windows can be effectively displayed in the large window. Thereby the effect same as the fourth aspect can be achieved.

A sixth aspect of the present invention provides a program for a user interface of a computer. The program causes the computer to perform the steps of: displaying a large window for the whole application on a display screen; arranging three or more small windows in the large window displayed on the display screen in one direction to display the same; accepting an input to maximize any of the three or more small windows; accepting an input to minimize any of the three or more small windows; minimizing the small windows other than one window in the large window when the maximization accepting section accepts the input to maximize the one small window to display the same, and extending the one window to a space generated by the minimization in the large window to cause the small widow display section to display the same; and minimizing one small window in the large window to display the same when the minimization accepting section accepts the input to minimize the one small window and for extending at least one of the small windows other than the one window in the large window to a space generated by the minimization to display the same. Thereby the effect same as the fourth aspect can be achieved.

A seventh aspect of the present invention provides a display apparatus. The display apparatus includes a large window display section for displaying a large window for the whole application on a display screen and a small window display section for displaying a plurality of windows corresponding to a plurality of works in the application in the large window displayed on the display screen. The small window display section sequentially adds or opens the plurality of small window at a predetermined time difference to display the same when the application is started. The large window display section gradually extends the large window depending on the number or the opening state of the small windows currently displayed by the small window display section at a predetermined time difference when the application is started. Thereby the small windows corresponding to each work are displayed at a predetermined time difference when the application is started, so that each work unit can be clearly presented to the user before operating.

The small window display section may display a plurality of small windows corresponding to a plurality of works in the order same as the operational sequence of the plurality of works when the application is started. Thereby the operational sequence of the plurality of works can be clearly presented to the user before operating the application.

The small window display section may display a plurality of small windows corresponding to a plurality of works in descending order of a predetermined importance in the plurality of works when the application is stated. Thereby the importance of the plurality of works can be clearly presented to the user before operating.

An eighth aspect of the present invention provides a display apparatus. The display apparatus includes a large window display section for displaying a large window for the whole application, and a small window display section for displaying a plurality of windows corresponding to a plurality of works in the application. The small window display section sequentially changes the display of the plurality of small windows from a non-acceptance display indicating that the application does not accept any input from the user to an acceptance display indicating that the application accepts an input from the user. Thereby the displays of the small windows corresponding to each work are changed from the non-acceptance display to the acceptance display at a predetermined time difference when the application is started. Therefore, each work unit can be clearly presented to the user before the application is started.

A ninth aspect of the present invention provides a display method. The display method includes the steps of: displaying a large window for the whole application on a display screen; and displaying a plurality of small windows corresponding to a plurality of works in the applications in the large window displayed on the display screen. When the application is started, the plurality of small windows are sequentially added or opened in the large window at a predetermined time difference. Additionally, when the application starts running, the large window is gradually extended at a predetermined time difference depending on the number or the opening state of the small windows currently displayed on the display screen. Thereby the effect same as the seventh aspect can be achieved.

A tenth aspect of the present invention provides a display method. The display method includes the steps of: displaying a large window for the whole application on a display screen; and displaying a plurality of small windows corresponding to a plurality of works in the applications in the large window displayed on the display screen. When the application is started, the display of the plurality of small windows are sequentially changed from a non-acceptance display indicating that the application does not accept any input from the user to an acceptance display indicating that the application accepts an input from the user. Thereby the effect same as the eighth aspect can be achieved.

An eleventh aspect of the present invention provides a program causes a computer to perform a large window display function for displaying a large window for the whole application and a small window display function for displaying a plurality of small windows corresponding to a plurality of works in an application in the large window displayed on the display screen. The small window display function sequentially adds or opens the plurality of small windows in the large window at a predetermined time difference to display the same when the application is started. The large window display function gradually extends the large window at a predetermined time difference depending on the number or the opening state of the small windows currently displayed by the small window display function when the application is started. Thereby the effect same as the seventh aspect can be achieved.

A twelfth aspect of the present invention provides a program causes a computer to perform a large window display function for displaying a large window for the whole application and a small window display function for displaying a plurality of small windows corresponding to a plurality of works in an application in the large window displayed on the display screen. The small window display function sequentially changes the display of the plurality of small windows from a non-acceptance display indicating that the application does not accept any input from the user to an acceptance display indicating that the application accepts an input from the user at a predetermined time difference when the application is started. Thereby the effect same as the eighth aspect can be achieved.

Here, all necessary features of the present invention are not listed in the summary of the invention. The sub-combinations of the features may become the invention.

BRIEF DESCRIPTION OF THE DRAWINGS

FIG. 22 shows an example of a display state transition table 134 stored in a small window information storage section 130;

FIG. 23 shows an example of a display discrimination table 136 stored in the small window information storage section 130;

DETAILED DESCRIPTION OF THE INVENTION

Hereinafter, the present invention will now be described through referred embodiments. The embodiments do not limit the invention according to claims and all combinations of the features described in the embodiments are not necessarily essential to means for solving the problems of the invention.

Figure 1:
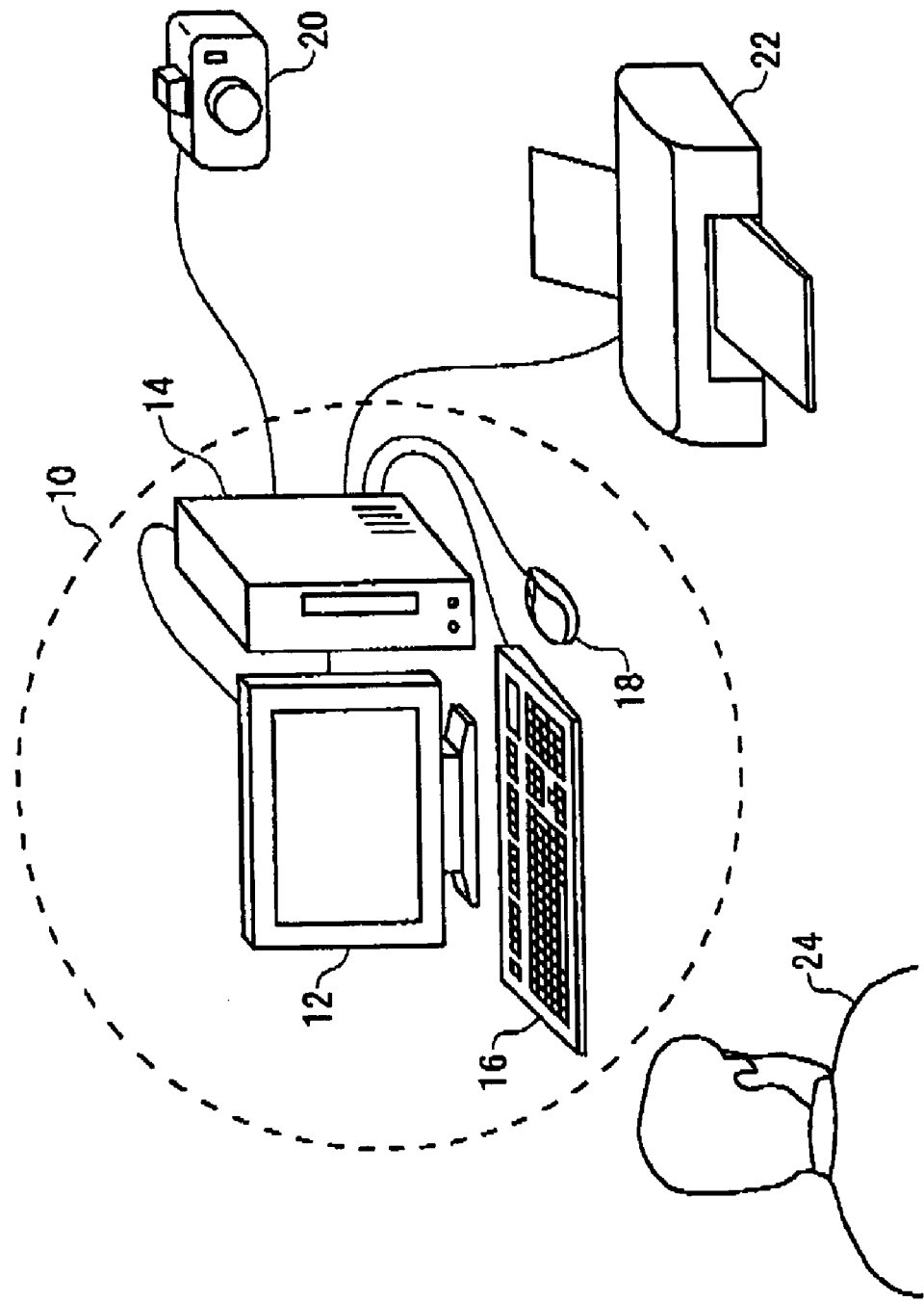
FIG. 1 is a schematic diagram showing the hardware configuration of an image processing apparatus 10 according to an embodiment of the present invention.

FIG. 1 is a schematic diagram showing the hardware configuration of an image processing apparatus 10 according to an embodiment of the present invention. A digital camera 20 captures an object using optical elements and generates digital image information on the object. An image processing apparatus 10 acquires the image information from the digital camera 20, generates printing information by performing image processing on the acquired image information and outputs the generated printing information to a printer 22. The printer 22 prints print information on a recording medium based on the printing information outputted from the image processing apparatus 10. The printer may be an inkjet recording apparatus, for example.

The image processing apparatus 10 includes a personal computer 14 for performing an image processing application, a display 12 for displaying a screen to a user 24 based on the output from the personal computer 14, and a keyboard 16 and a mouse 18 which are examples of input means for inputting from the user 24 to the computer 14. The present embodiment aims to provide an user interface for clearly presenting to the user 24 the process to generate printing information from image information in the image processing application performed in the personal computer 14 of the image processing apparatus 10.

Figure 2:
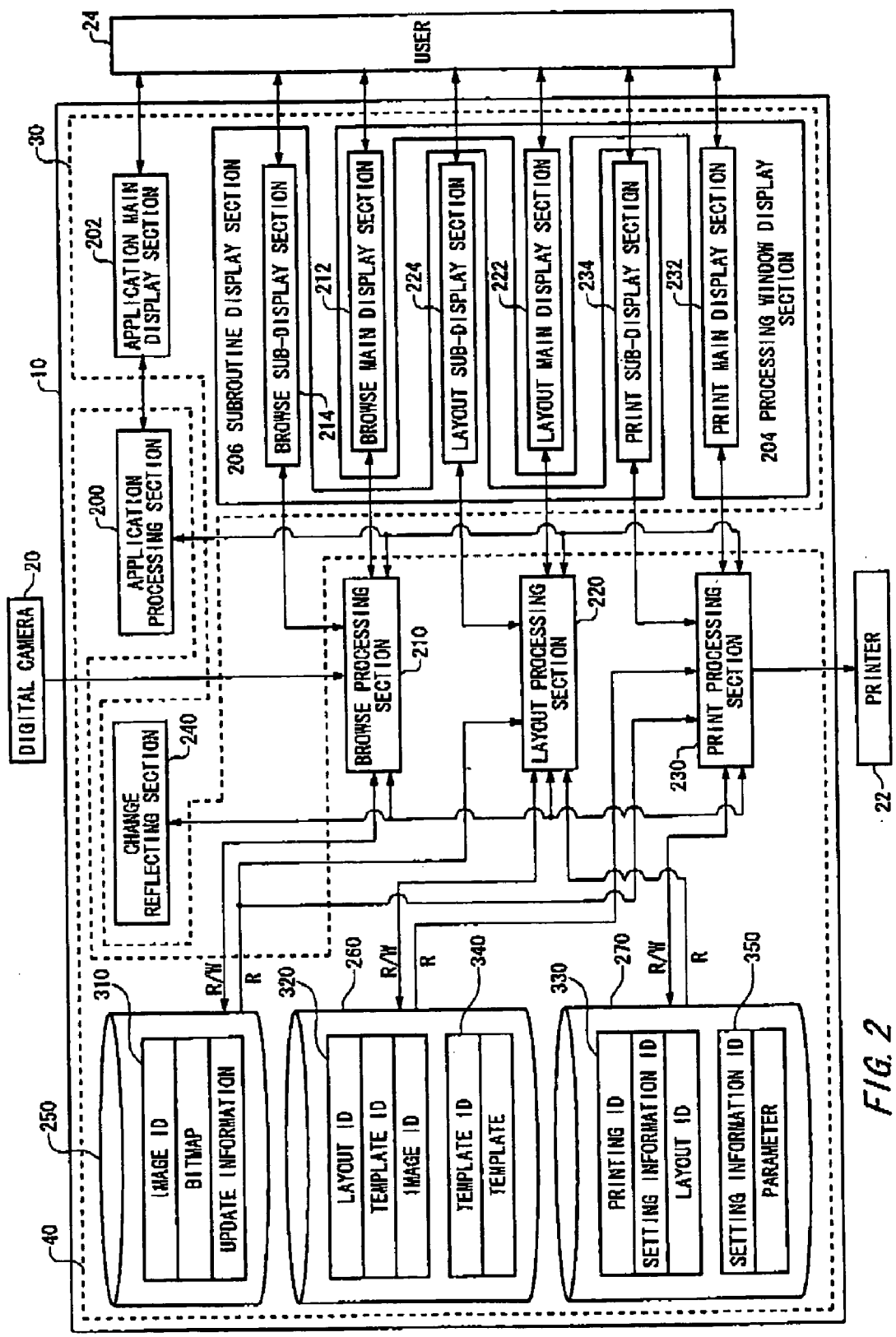
FIG. 2 is a functional block diagram explaining the function of an image processing apparatus 10.
Figure 3:
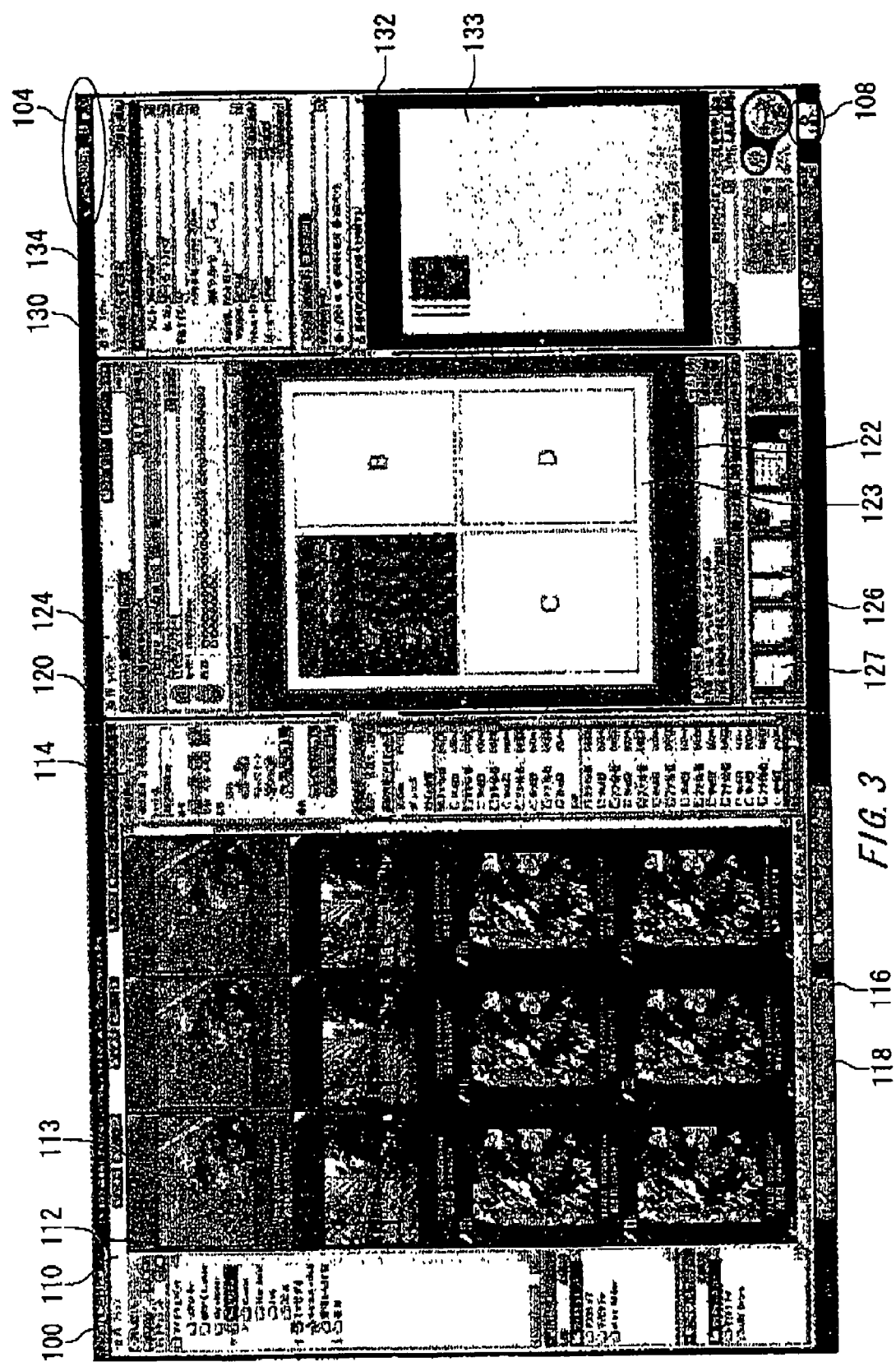
FIG. 3 shows an example of a display screen displayed by a user interface section 30 of the image processing apparatus 10.
Figure 4:
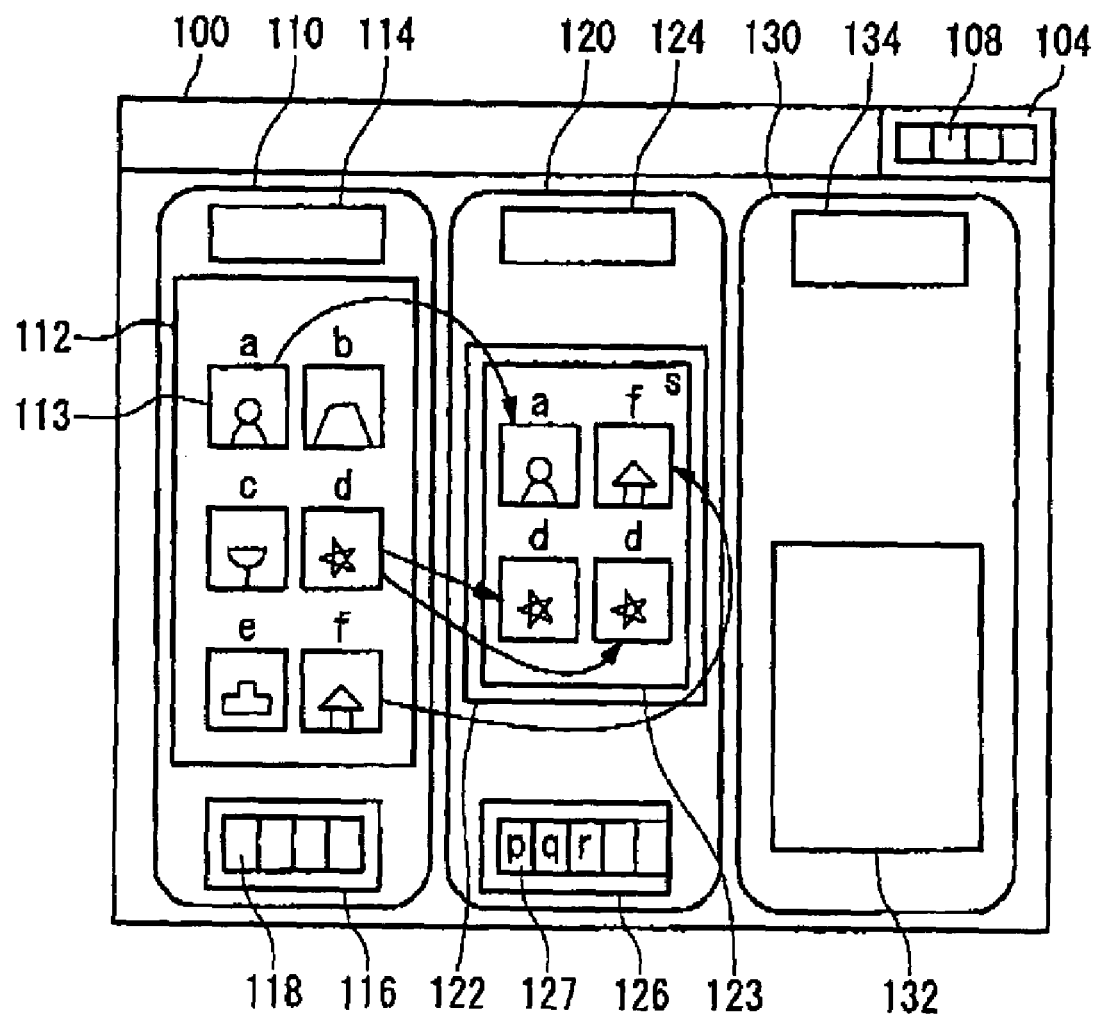
FIG. 4 is a schematic view of FIG. 3.

FIG. 2 is a functional block diagram explaining the function of an image processing apparatus 10. FIG. 3 shows an example of a display screen displayed by a user interface section 30 of the image processing apparatus 10. FIG. 4 is a schematic view of FIG. 3.

As shown in FIG. 2, the image processing apparatus 10 includes an image processing section 40 for generating printing information 330 from the image information 310 acquired from the digital camera 20 and a user interface section 30 for displaying a display screen of a display 12 based on the output from the image processing section 40, receiving an input from the user 24 through the keyboard 16 or the mouse 18 and passing the same to the image processing section 40. The user interface section 30 is an example of the display apparatus for the user interface according to the present invention.

The image processing section 40 includes an application processing section 200 for performing the processing including staring and terminating in the whole of the image processing application, a browse processing section 210 for acquiring image information 310 from the digital camera 20 and displaying the same on the display 12 and an image information storage section 250 for storing the image information 310 acquired by the browse processing section 210. The image processing section 40 further includes a layout processing section 220 for generating layout information 320 by allocating the image information 310 stored in the image information storage section 250 and a layout information storage section 260 for storing the layout information 320 generated by the layout processing section 220. The image processing section 40 further includes a print processing section 230 for generating printing information 330 based on the layout information 320 stored in the layout information storage section 260 and outputting the same to the printer 22 and a printing information storage section 270 for storing the printing information 330 generated by the print processing section 230. Additionally, each of the browse processing section 210, the layout processing section 220 and the print processing section 230 has a subroutine processing, respectively.

The browse processing section 210 acquires the image information 310 from the digital camera 20 and stores the same. Additionally, the browse processing section 210 displays the image information 310 on the display 12 through the after-described user interface section 30. Further, the browse processing section 210 reads the image information 310 stored in the image information storage section 250 and performs browse processing such as thumbnail display, color correction and flip horizontal.

The image information storage section 250 stores the image information 310 including a bitmap and update information indicative of the contents obtained by updating the bitmap by the browse processing of the browse processing section 210 in association with the image ID for identifying the image information 310. The image information storage section 250 stores the update information regarding the bitmap along with the bitmap acquired from the digital camera 20. Therefore, the bitmap which is acquired from the digital camera 20 and is not processed by the browse processing section 210 yet may be outputted to the outside in response to an external request. Here, the term of bitmap is broadly used as an image represented by the collection of dots and includes a form of JPEG. Additionally, the image information storage section 250 may store the image information 310 including an image represented by a vector map, that is the collection of vector data instead of the bitmap.

The layout information storage section 260 stores template information 340 in addition to the layout information 320. The template information 340 includes a template which is a form of the layout expected to be frequently used and a template ID for identifying the template. Additionally, the layout information 320 includes a layout ID for identifying the layout information 320 generated by the layout processing section 220, a template ID used to generate the layout and an image ID of the image information 310 allocated to the layout. Here, when a layout is generated in the layout processing section 220 without using the template, the layout information storage section 260 receives information indicative of the content of the layout from the layout processing section 220 and stores the same as substitute for the template ID.

The printing information storage section 270 stores setting information 350 in addition to the printing information 330. The setting information 350 includes each parameter set to a printer driver of the printer 22 and a setting information ID for identifying the setting information 350. Additionally, the printing information 330 includes a printing ID for identifying the printing information generated by the print processing section 230, a setting information ID used to generate the printing information and a layout ID of the layout information 320 printed by the printing information 330.

The user interface section 30 includes: an application main display section 220 for displaying an application window 100 shown in FIG. 3 on the display screen of the display 12; a processing window display section 204 for displaying in the application window on the display screen, a browse window 110 including displaying the image information 310, a layout window 120 including displaying the layout information 320 and a print window 130 including displaying printing information 330; and a subroutine display section 206 for displaying a new window for the subroutine when a subroutine processing is selected in each processing, and for closing the window of the subroutine when the end of the subroutine processing is selected. The user interface section 30 further includes, when the image information 310 and the layout information 320 are changed in the browse processing section 210 and the layout processing section 220, respectively, a change reflecting section 240 for changing the displays of the layout window 120 and the print window 130 in response to the change of the image information 310 and the layout information 320. Here, the application main display section 202 is an example of the application window according to the present invention.

The processing window display section 204 includes a browse main display section 212 for displaying the browse window 110, a layout main display section 222 for displaying the layout window 120 and a print main display section 232 for displaying the print window 130. Additionally, the processing window display section 204 includes a subroutine display section 206, a browse sub-display section 214 for displaying an window for the subroutine of the browse processing, a layout sub-display section 224 for displaying an window for the layout processing and a print sub-processing display section 234 for displaying an window for the print processing.

A recording medium 50 stores a program which operates at least the user interface 30. The program stored on the recording medium 50 is installed in the personal computer 1 to allow the personal computer 14 to operate as the user interface section 30. Additionally, the personal computer 14 may acquire such program through a communication line.

The application window 100 shown in FIG. 3 and FIG. 4 is a window for the whole processing of the image processing application. In order to display the application window 100, the application processing section 200 develops display data for displaying the application window 100 on the memory and generates the same. The application main display section 202 receives the display data generated by the application processing section 200 and displays the application window 100. An image processing application operating area 104 on which the item about the operation regarding the whole application is displayed is presented in the application window 100. An example of the item which is displayed on the image processing application operation area 104 may be a start/end button 108 for accepting to start or end the image processing application.

The browse window 110 is a window for providing information regarding the browse processing. The browse main display section 212 displays the browse window 110 in the application window 100. The browse main display section 212 displays the browse window 110 to the left in the application window 100 in FIG. 3 and FIG. 4. In order to display the browse window 100, the browse processing section 210 refers to image information storage section 250, develops the image information 310 stored in the image information storage section 250 and generates display data. The browse main display section 212 receives the display data from the browse processing section 210 from the browse processing section 210 and displays the same on the browse window 110. The browse window 110 includes a thumbnail image display area 112 for displaying the display image 113, a browse processing operation area 114 and an image processing area 116. The item of a function included in the browse processing section 210 but not involving mainly to change the image information 310 is displayed on the browse processing operation area 114. Alternatively, the item of a function included in the browse processing section 210 and involving mainly to change the image information 310 is displayed on the image processing area 116. When the user 24 selects or inputs the item of the browse processing operation area 114 or the image processing area 116, the browse processing section 210 performs the function according to the selected or inputted content. For example, when the user 24 selects or inputs the item of the browse processing operation area 114, the browse processing section 210 determines which display images 113 are selected on the thumbnail image display area 112, and how to display the same on the thumbnail image display area 112. Here, the browse window 110 may include one area obtained by putting together the functions of the browse processing operation area 114 and the image processing area 116.

The layout window 120 provides information regarding the layout processing. The layout main display section 222 displays the layout window 120 in the application window 100. The layout main display section 222 displays the layout window 120 at the center of the application window 100 in FIG. 3 and FIG. 4. In order to display the layout window 120, the browse processing section 210 refers the layout information storage section 260, develops the layout information 320 stored in the layout information storage section 260 on the memory and generates display data. The layout main display section 222 displays the display data on the layout window 120. The layout window 120 includes a layout information display area 122, a layout processing operation area 124 and a layout list display area 126. The item of the function included in the layout processing section 220 is displayed on the layout processing operation area 124. When the user 24 selects or inputs the item of the layout processing operation area 124, the layout processing section 220 performs the function according to the selected or inputted content. For example, when the user 24 selects or inputs the item of the layout processing operation area 124, the layout processing section 220 determines whether the existing template is used to generate the layout information 320 and selects the image information 310 to be laid out. The layout information 320 in generating is displayed as an editing layout 123 on the layout information display area 122. The layout list display area 126 is an area on which the editing layout 123 which is in creating and has been created is displayed as a series of pages. Additionally, a list of template names in association with the template IDs is displayed in the layout processing operation area 124. The user 24 selects the template name from the list in the layout processing operation area 124. Therefore, the layout processing section 220 acquires the template ID corresponding to the template name selected by the user 24 and acquires template information with reference to the layout information storage section 260.

The print window 130 provides information regarding the print processing. The print main display section 232 displays the print window 130 in the application window 100. The print main display section 232 displays the print window 130 to the right in the application window 100 in FIG. 3 and FIG. 4. In order to display the print window 130, the print processing section 230 refers the printing information storage section 270, develops the printing information 330 stored in the printing information storage section 270 on the memory and generates display data. The print main display section 232 displays the display data in the print window 130. The print window 130 includes a printing information display area 132 and a print processing operation area 134. The item of the functions included in the print processing section 230 is displayed on the print processing operation area 134. When the user 24 selects or inputs the item in the print processing operation area 134, the print processing section 230 performs the function according to the selected or inputted content. For example, when the user 24 selects or inputs the item disposed on the print processing operation area 134, the print processing section 230 selects the layout information 320 to be printed, determines the paper size and generates the printing information 330. The printing information 330 in generating is displayed as a print preview 133 on the printing information display area 132.

Now, a display screen based on the process to acquire the image information 310 and generate the printing information setting information 350 is described with reference to FIG. 4. The user 24 drags and drops the display image 113 to a certain position in the layout information display area 122 to instruct the image processing apparatus 10 to allocate the display image 113 to the certain position in the editing layout 123. FIG. 4 shows an example of allocating a display image 113a (person), 113d (star) and 113f (house) to the editing layout 123.

The browse processing section 210 and the layout processing section 220 recognize that the user 24 has dragged and dropped by notifying from each of the browse main display section 212 and the layout main display section 222. The browse processing section 210 identifies the image ID of the image information 310 from the position of the display image 113 which has been dragged in the browse window 110. The browse processing section 210 notifies the layout processing section 220 of the identified image ID through the after-described change reflecting section 240. The layout processing section 220 identifies the allocated position in the editing layout 123 from the dropped position. The layout processing section 220 generates the layout information 320 after the drag and drop based on the information on the image ID and the allocated position. The layout processing section 220 instructs the layout main display section 222 to display the generated layout information 320. Thereby the layout main display section 222 displays the editing layout 123 based on the layout information 320.

Figure 5:
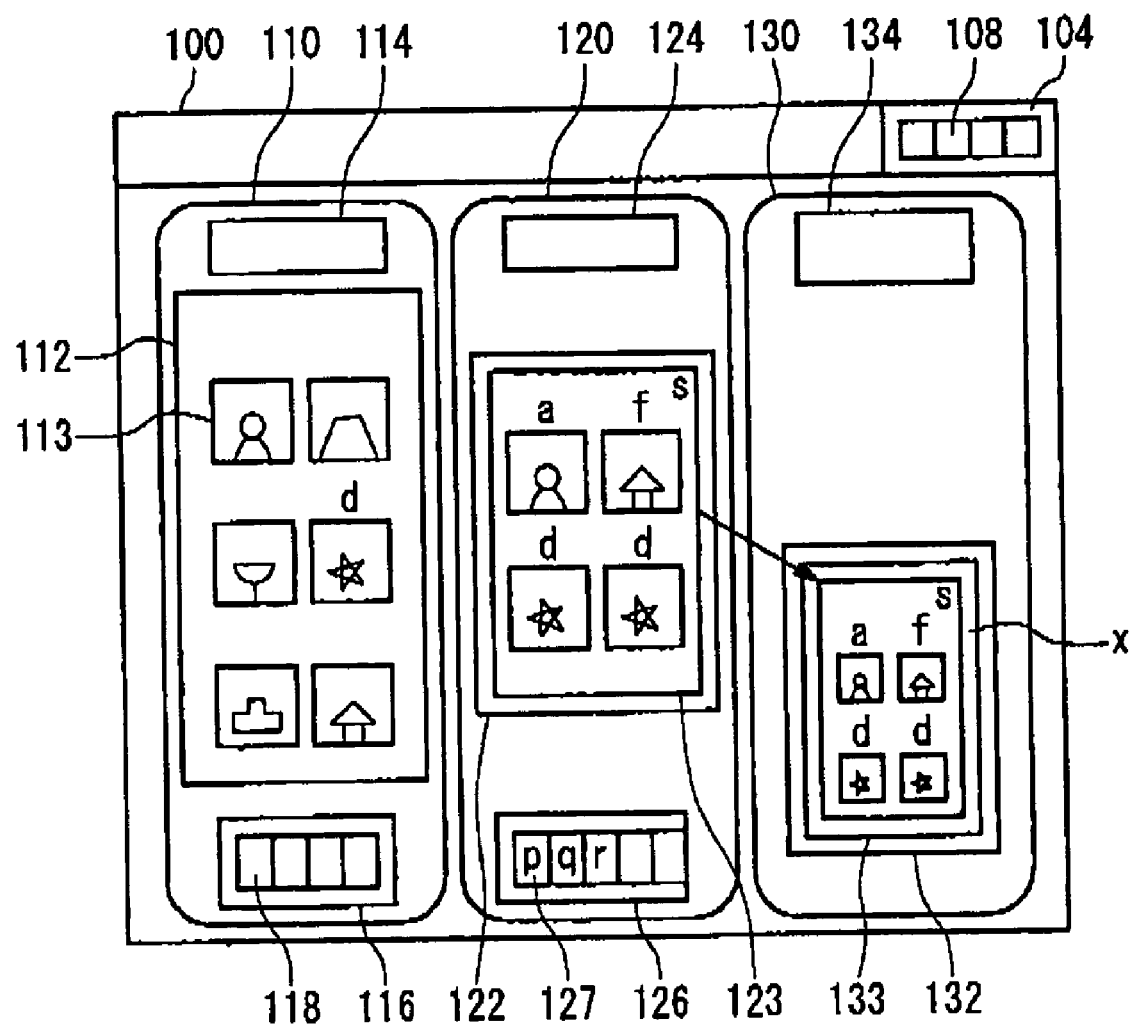
FIG. 5 is a schematic view showing an example of the display seen following FIG. 4.

FIG. 5 is a schematic view showing an example of the display screen following FIG. 4. The user 24 can reflect the editing layout 123 on the position corresponding to a certain position of the print preview 133 by dragging and dropping the editing layout 123 on the certain position in the printing information display area 132. FIG. 5 shows an example of pasting an editing layout 123a to which the display images 113a (person), 113d (star) and 113f (house) are allocated on the print preview 133.

The layout processing section 220 and the print processing section 230 recognize that the user 24 has dragged and dropped by notifying from each of the layout main display section 222 and the print main display section 232. The layout processing section 220 identifies the layout ID of the editing layout 123 from the dragged position and notifies the print processing section 230 of the identified layout ID through the change reflecting section 240. The print processing section 230 generates the printing information 330 after the drag and drop based on the layout ID and the pasted position and instructs the print main display section 232 to display the same. Thereby the print main display section 232 displays the print preview 133 based on the printing information 330. Here, the browse processing, the layout processing and the print processing can be individually operated, but the image information 310 is designated in the layout processing at least once, and also the layout information 320 is designated in the print processing at least once. Therefore, the browse processing, the layout processing and the print processing are cooperated with each other in the described order as a workflow.

As described above, since the browse window 110, the layout window 120 and the application window 130 are displayed in the application window 100, the user 24 can clearly recognize the process to acquire the image information 310 and output the printing information setting information 350.

Figure 6A:
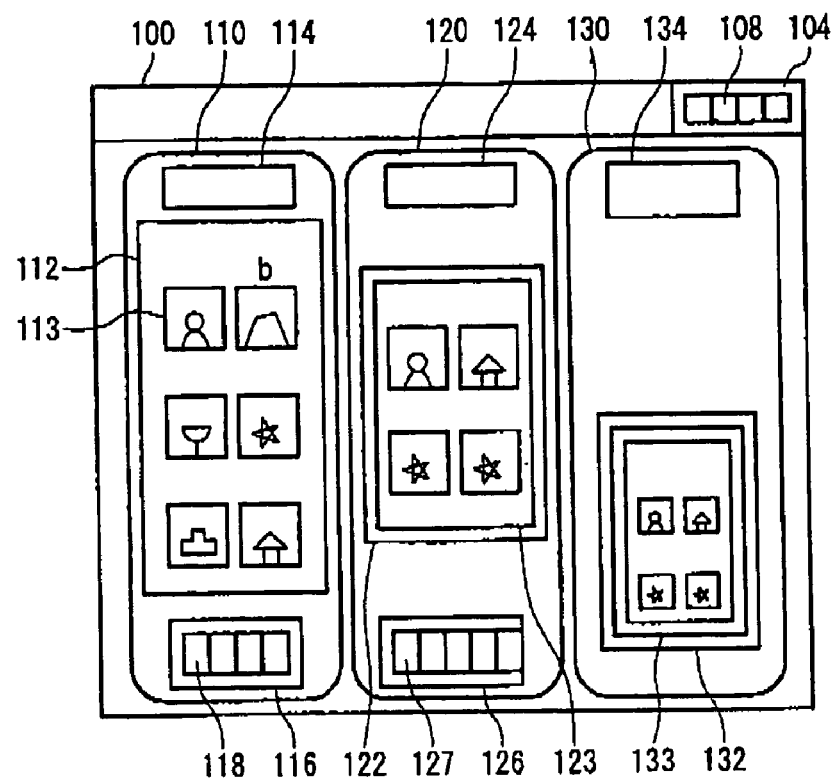
FIG. 6A and FIG. 6B are schematic views showing transition of a display screen on which a subroutine display section 206 of the image processing apparatus 10 displays a browse sub-window 140.
Figure 6B:
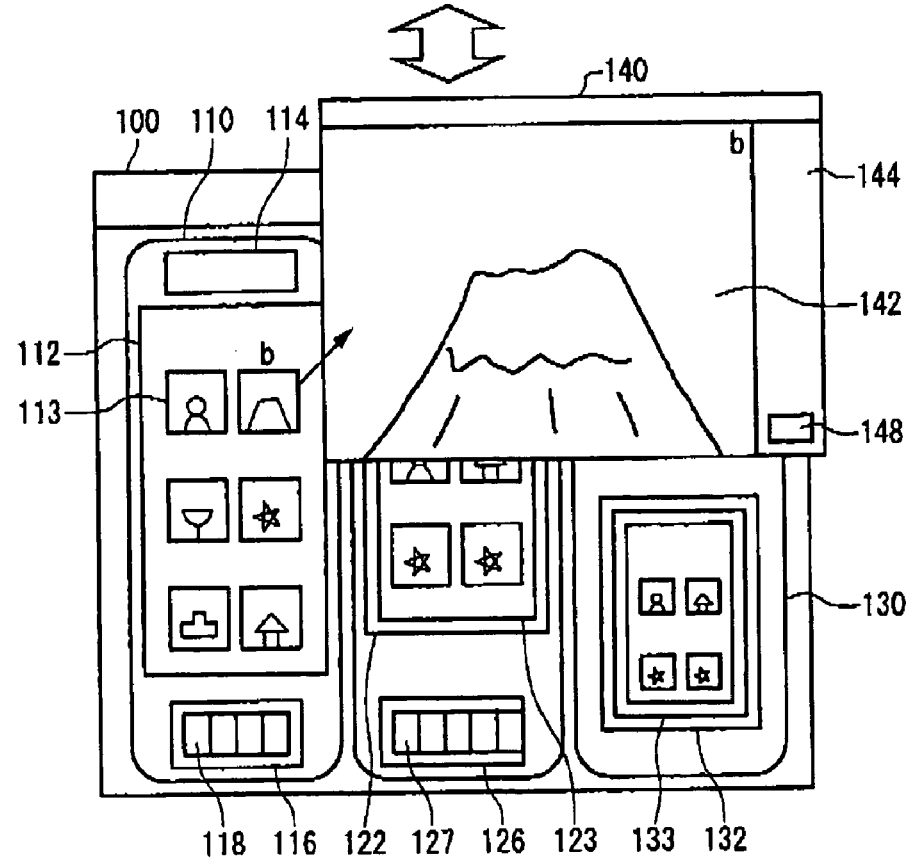
Figure 7:
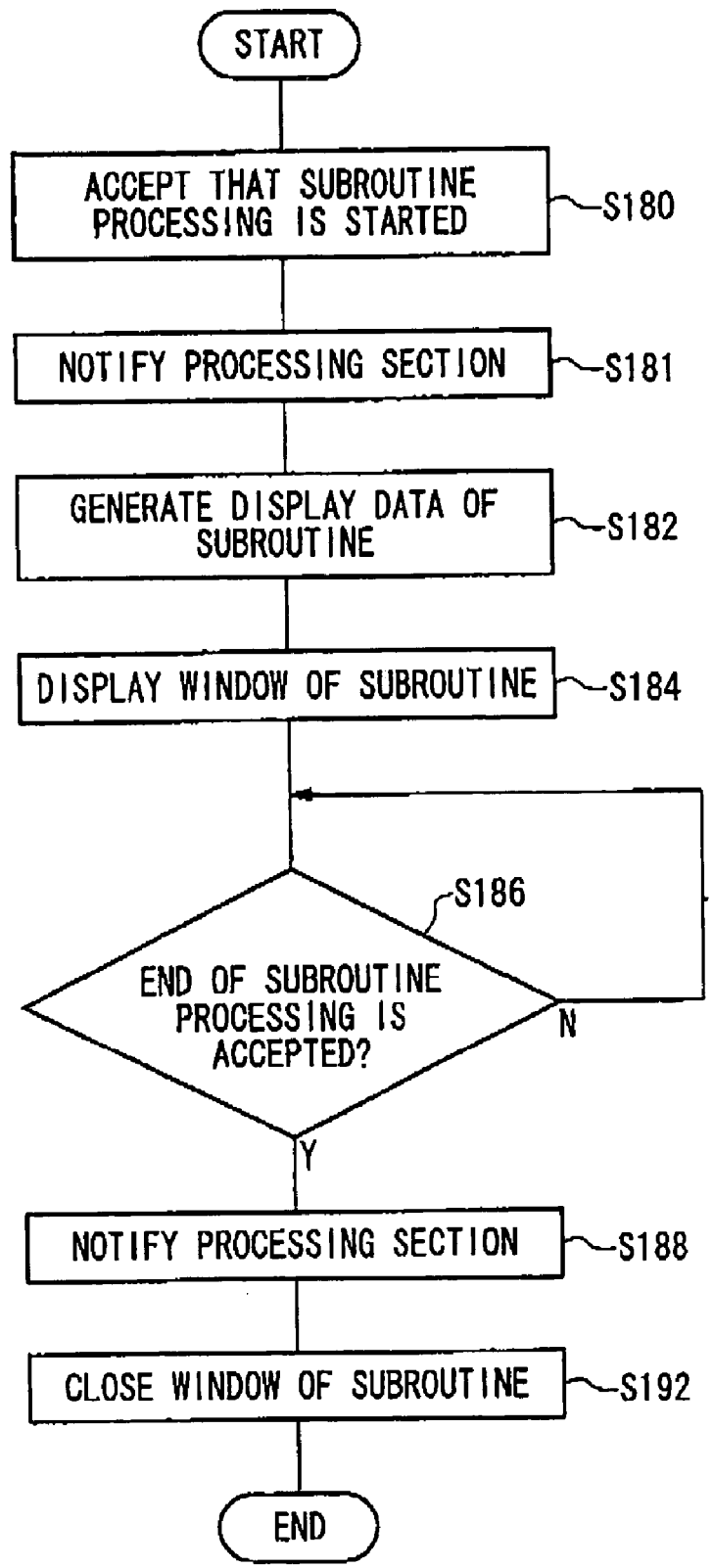
FIG. 7 is a flowchart showing the operation of the subroutine display section 206 to display the browse sub-window 140.

FIG. 6A and FIG. 6B are schematic views showing transition of a display screen on which a subroutine display section 206 displays a browse sub-window 140. FIG. 7 is a flowchart showing the operation of the subroutine display section 206 to display the browse sub-window 140. Here, FIG. 6A shows the display 12 on which a browse sub-window 140 which is one window for the subroutine involved in the browse processing is not displayed. FIG. 6B shows the display 12 on which the browse sub-window 140 is displayed Now, an operation of the flowchart shown in FIG. 7 is started at the state shown in FIG. 6A. When the user 24 selects a display image 113b in a thumbnail image display area 112 and also selects an image processing editing button 118 displayed on an image processing area 116 in a browse window 110, the browse main display section 212 accepts that a subroutine processing is started (S180).

The browse main display section 212 notifies the browse processing section 210 that the display image 113b is selected and the subroutine processing is accepted (S181). In is case, the browse main display section 212 identifies for the browse processing section 210 the image ID of the image information 310 of the display image 113b based on the position of the display image selected by the user 24.

The browse processing section 210 refers the image information 310 based on the identified image ID, develops the bitmap of the image information 310 associated with the image ID and generates display data (S182). In this case, when update information is stored in the image information 310 in association with the image ID, the browse processing section 210 generates display data based on the bitmap image is updated by the update information.

Next, the browse sub-display section 214 displays a browse sub-window 140 based on the display data generated by the browse processing section 210 (S184). The browse sub-window 140 has an image information display area 142 on which the display image 113b based on the selected image information 310 is displayed and a subroutine operation area 144 on which the item regarding the subroutine processing is displayed. When the user 24 selects or inputs the item disposed in the subroutine operation area 144, the browse processing section 210 performs the subroutine processing involved in the browse processing.

The browse sub-display section 214 displays the browse sub-window 140 until accepting the end (S186: No). When the browse sub-display section 214 accepts the end of the subroutine processing (S186: Yes), the browse sub display section 214 notifies the browse processing section 210 that the end is accepted (S188). For example, the browse sub-display section 214 detects that the user 24 selects a subroutine end button 148 disposed in the subroutine operation area 144 and determines that the end of the subroutine processing is accepted. Here, when any change such as color correction is occurred in the display image 113b displayed in the browser sub-window 140, the browse processing section 210 updates the change information in the image information 310 on the display mage 113b.

The browse sub-display section 214 closes the browse sub-window 140 (S192). Here, the order of the steps S188 and S192 may be reversed. Thus, the flowchart shown in FIG. 7 is ended.

Hereinbefore, the operation that the browse sub-display section 214 displays the browse sub-window 140 and closes the same has been described. The layout sub-display section 224 displays and closes the layout sub-window being an window for the subroutine involved in the layout processing in the same way. Additionally, the print sub-display section 234 displays and closes the print sub-window being an window of the subroutine involved in the print processing.

According to the subroutine display section 206, as described above, when each subroutine processing is performed, the window involved in each subroutine processing is displayed independent of the information regarding the main routine processing of the image information, the layout information and the printing information. Therefore, the subroutine processing can be provided while the user clearly recognizes the process to generate the printing information 330 from the image information 310. Additionally, when the subroutine processing is ended, the display screen is turned to the former display screen for the main routine processing on which each window for the image information 310, the layout information 320 and the printing information 330 are laid out. Therefore, the user 24 can clearly recognize the process to generate the printing information 330 from the image information 310 after each subroutine is processed.

Figure 8A:
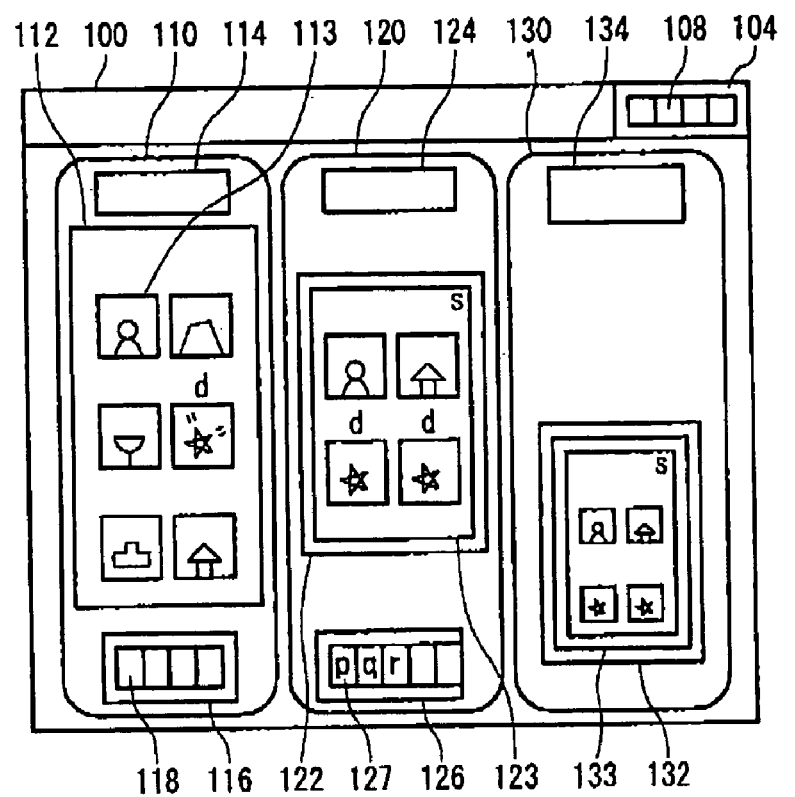
FIG. 8A and FIG. 8B are schematic views showing an example of a display screen displayed on a display 12 by a change reflecting section 240.
Figure 8B:
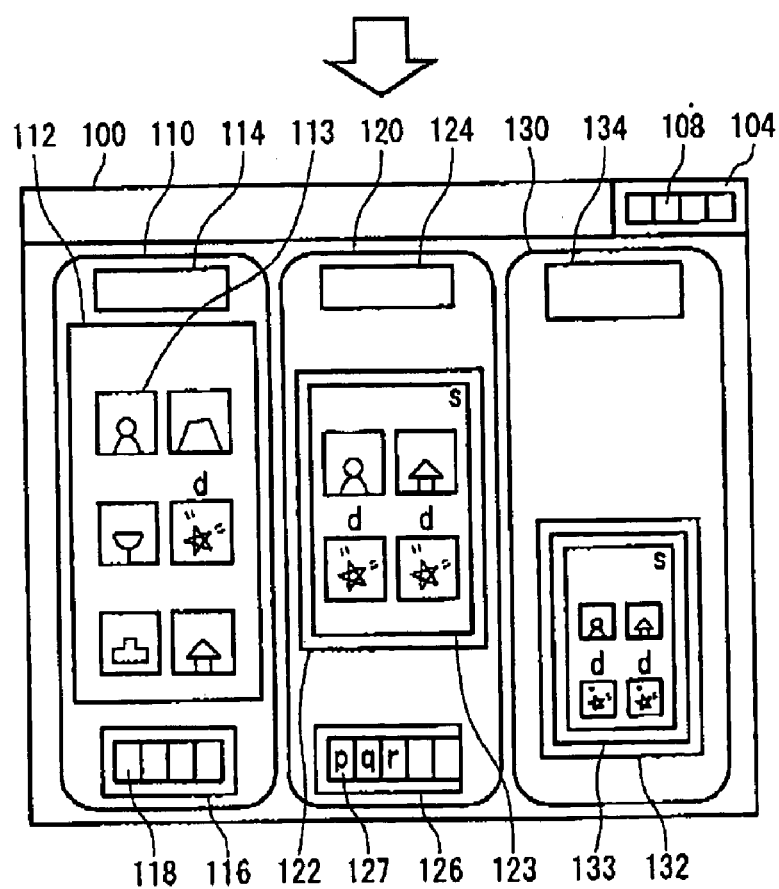
Figure 9:
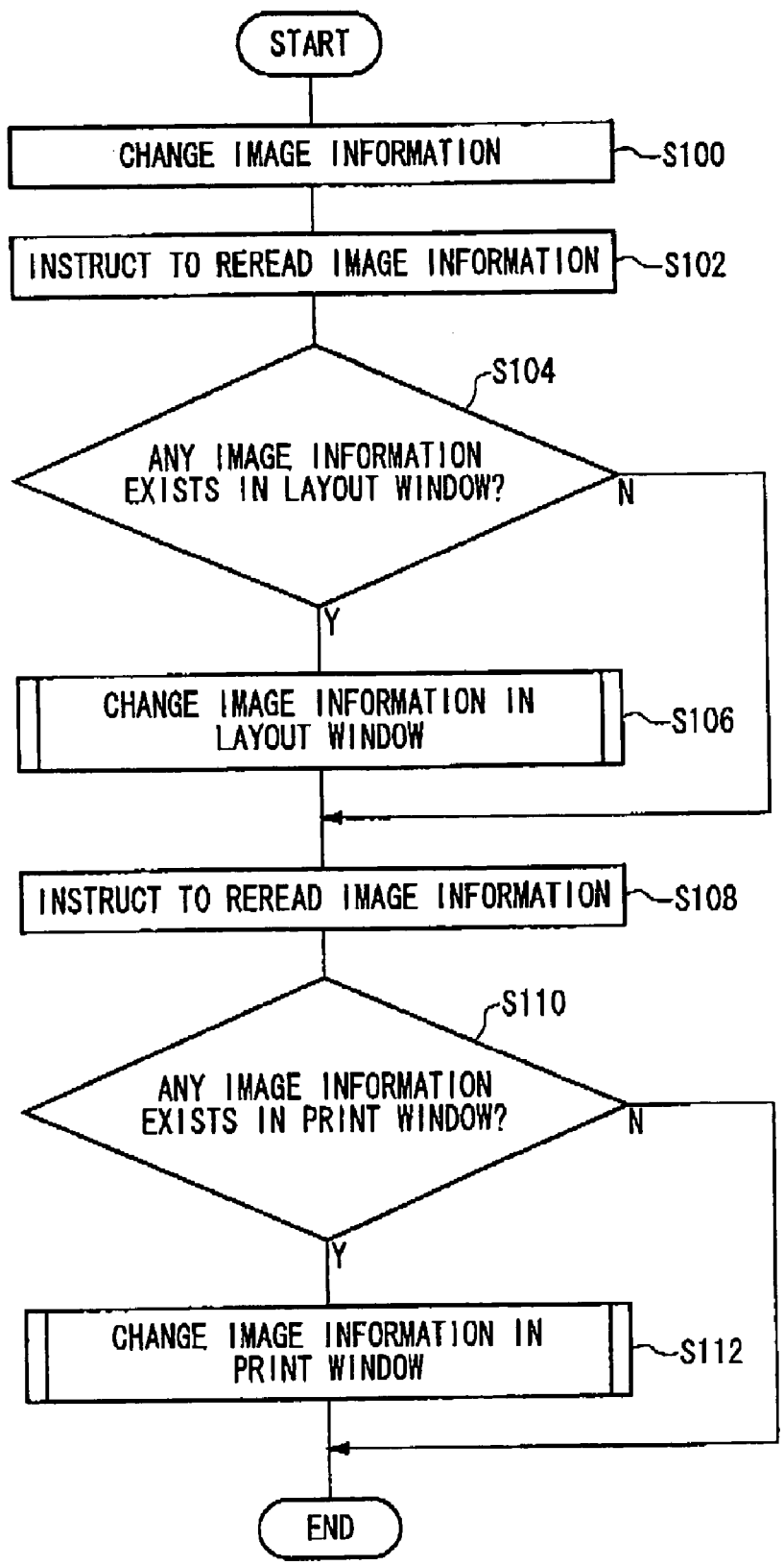
FIG. 9 is a flowchart showing the operation of the change reflecting section 240 to update a display screen.

FIG. 8A and FIG. 8B are schematic views showing an example of a display screen displayed on a display 12 by a change reflecting section 240. Here, FIG. 8A shows a display screen which has not updated by the change reflecting section 240 yet. FIG. 8B shows a display screen which has been updated by the change reflecting section 240. FIG. 9 is a flowchart showing the operation of the change reflecting section 240 to update a display screen 113d.

As shown in FIG. 8A and FIG. 8B, when the image information 310 is changed in the brose processing, the change reflecting section 240 changes the display image 113d of the image information 310 displayed in a layout window 120 and a print window 130 according to the flowchart shown in FIG. 9.

The flowchart shown in FIG. 9 is started at the state shown in FIG. 5. The image information 310 is changed from the state shown in FIG. 5, for example. Here, the browse processing section 210 changes the image information 310 based on the operation of the user 24.

In this case, the browse processing section 210 generates display data based on the image information 310 and changes the display image 113d displayed on the display 12 (S100). For example, when the display image 113d as shown in FIG. 5 is selected from a subroutine operation area 144 in a browse sub-window 140 and changed, the browse processing section 210 generates display data based on the changed image information 310 and passes the same to the browse main display section 212. The browse main display section 212 displays the display image 1113d as shown in FIG. 8B on a browse window 110. Additionally, the browse processing section 210 notifies the browse sub-window 140 that the image information 310 is changed. The browse processing section 210 may include the image ID of the image information 310 in the notification, for example. Further, the browse processing section 210 updates the update information among the image information 310 on the display image 113d stored in the image information storage section 250.

Next, the change reflecting section 240 receives the notification of the change from the browse processing section 210 and instructs the layout processing section 220 to reread the image information 310 (S102). The browse sub-window 140 may include the image ID of the image information 310 in the instruction, for example.

According to the instruction, the layout processing section 220 determines whether the changed image information 310 is displayed in a layout window 120 (S104). For example, the layout processing section 220 compares the image ID of the display image 113d with the image ED in the memory region on which the display data of the layout window 120 is stored, and may determine that the image information 310 exists in the layout window 120 provided that at least one value of the image ID in the memory region is corresponded to the image ID of the display image 113d.

When the image information 310 is displayed in the layout window 120 in the step S104 (S104: Yes), the layout processing section 220 causes the layout main display section 222 to change the image information 310 displayed in the layout window 120 (S106). Therefore, the display image 113*d* displayed on an editing layout 123 in the layout window 120 is changed.

Meanwhile, when the image information 310 is not displayed in the layout window 120 in the steps S104 (S104: No), the layout processing section 220 ignores the instruction from the change reflecting section 240.

Additionally, the change reflecting section 240 instructs the print processing section 230 to reread the image information 310 (S180). The browse sub-window 140 may include the image ID of the image information 310 in the instruction, for example.

The print processing section 230 determines whether the changed image information 310 is displayed in a print window 130 (S110). This determination is same manner as the determination in the layout processing section 220. When the image information 310 is displayed in the print window 130 (S110: Yes), the print processing section 230 causes the print main display section 232 to change the image information 310 displayed in the print window 130 (S112). Therefore, the display image 113*d* displayed in a print preview 133 in the print window 130 is changed as shown in FIG. 8B. Alternatively, when the print processing section 230 determines that the image information 310 is not displayed in the print window 130 (S110: No), the print processing section 230 ignores the instruction from the change reflecting section 240. Thus, the flowchart as shown in FIG. 9 is ended.

As described above, when the image information 310 is changed in the browse processing, the display image 113*d* of the image information 310 displayed in the layout window 120 and the print window 130 is changed. Therefore, the user 24 can recognize that the change of the upstream processing affects the downstream processing.

Figure 10:
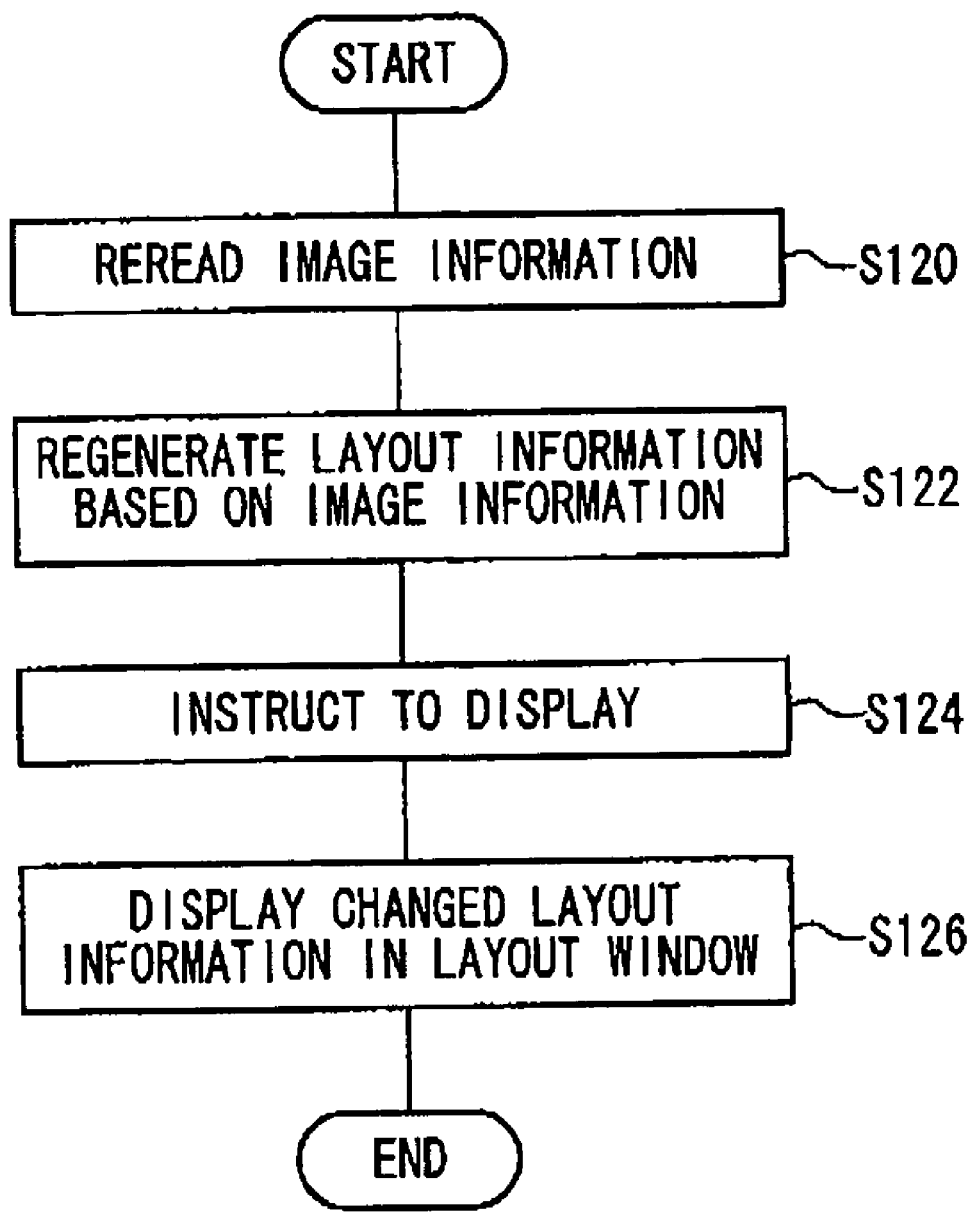
FIG. 10 is a flowchart showing in detail an operation of step S106 of FIG. 9.

FIG. 10 is a flowchart showing in detail the operation of step S106 of FIG. 9. The layout processing section 220 reads the image information 310 with the image ID of the image from the image information storage section 250 on the memory region in the step S106 (S120). The layout processing section 220 regenerates the display data on the memory region based on the read image information 310 (S122). As for the information used to regenerate the display data such as the layout information 320 or the template information 340 in addition to the image information 310, the layout processing section 220 utilizes the existing information on the memory region or reads the inflation from the layout information storage region 260. The layout processing section 220 instructs the layout main display section 222 to display the layout information 320 in the memory region (S124). The layout main display section 222 displays the content of the memory region on the layout information display area 122 in the layout window 120 as the editing layout 123 (S126). Thus, the flowchart is ended.

Figure 11:
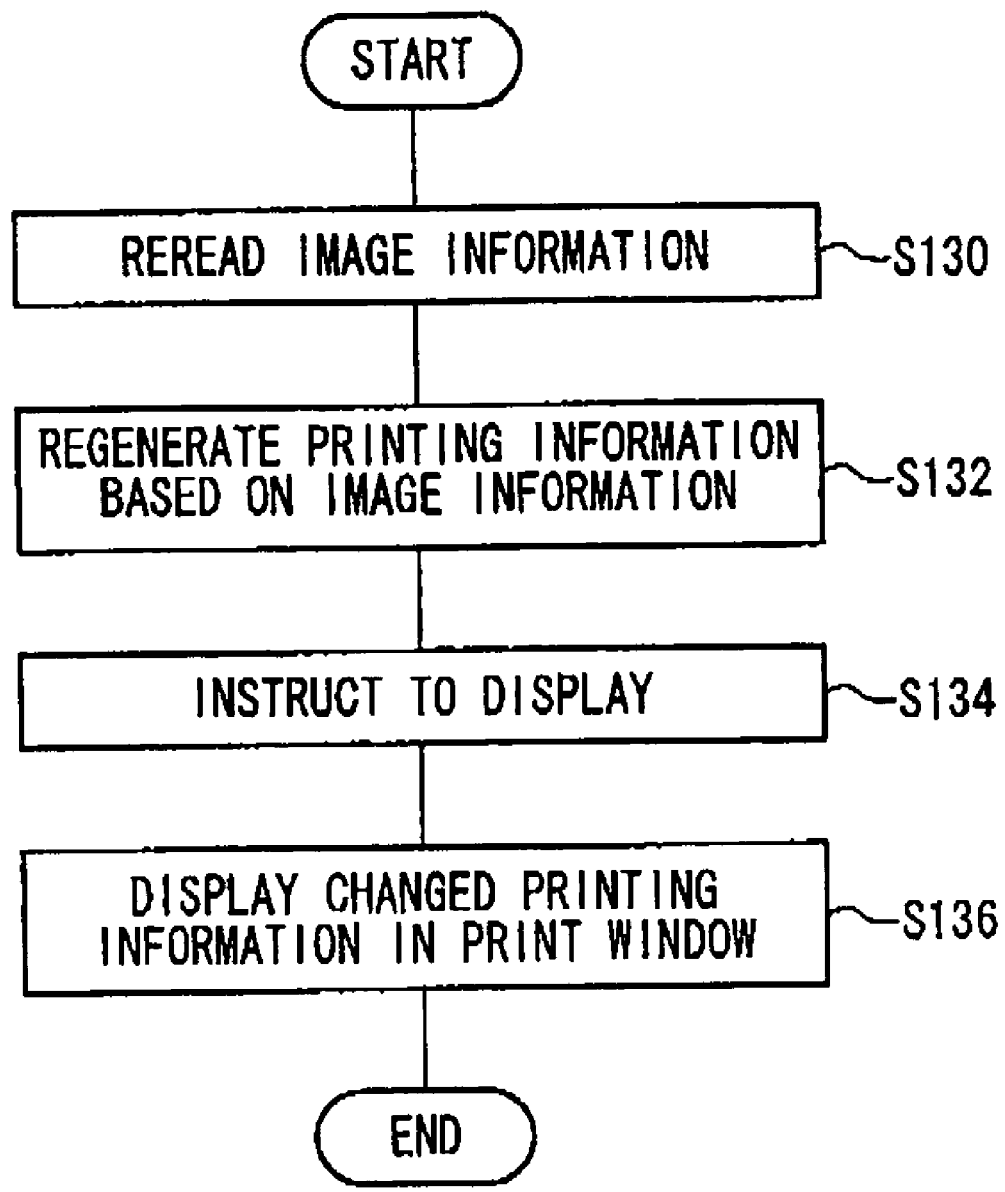
FIG. 11 is a flowchart showing in detail an operation of step S112 of FIG. 9.

FIG. 11 is a flowchart showing in detail the operation of step S112 of FIG. 9. Here, the operation of the step S112 is similar to that of the step S106 in FIG. 10. The print processing section 230 reads the image information 310 with the image ID into the memory region on which the display data is stored (S130) in the step S112. The print processing section 230 regenerates the display data on the memory region based on the read image information 310 (S132). In addition to the image information 310, the print processing section 230 utilizes the existing information on the memory region as the layout information 320, the template information 340, the printing information 330 or the setting information 350, or reads the information from the layout information storage section 260 or the printing information storage section 270. The print processing section 230 instructs the printing display section 232 to display the printing information 330 on the memory region (S134). The print main display section 232 displays the content of the memory region on a printing information display area 132 in a print window 130 as a print preview 133 (S136). Thus, the flowchart is ended.

Figure 12A:
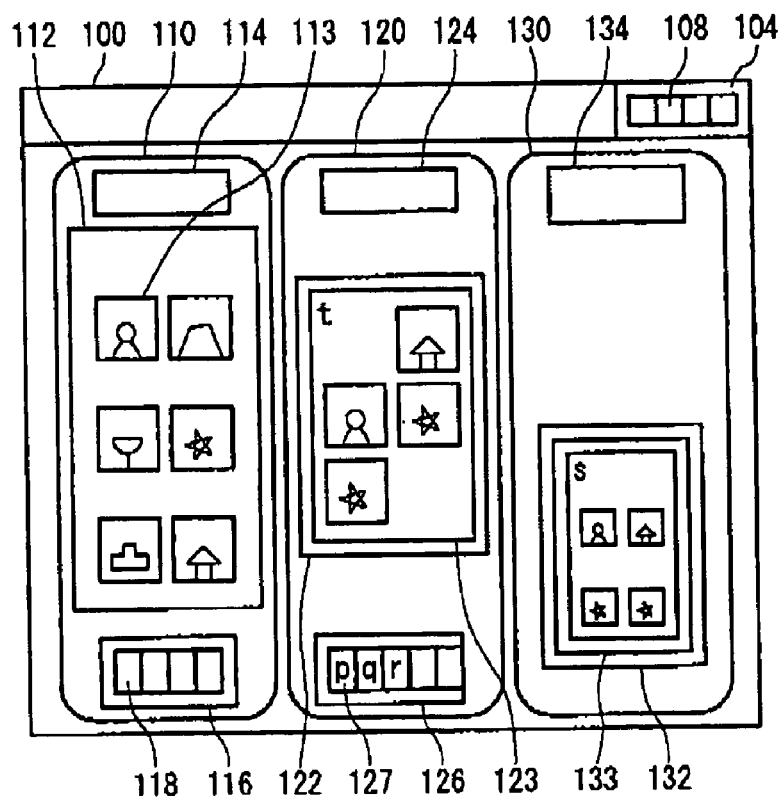
FIG. 12A and FIG. 12B are schematic views showing an example of the display screen displayed on the display 12 by the change reflecting section 240.
Figure 12B:
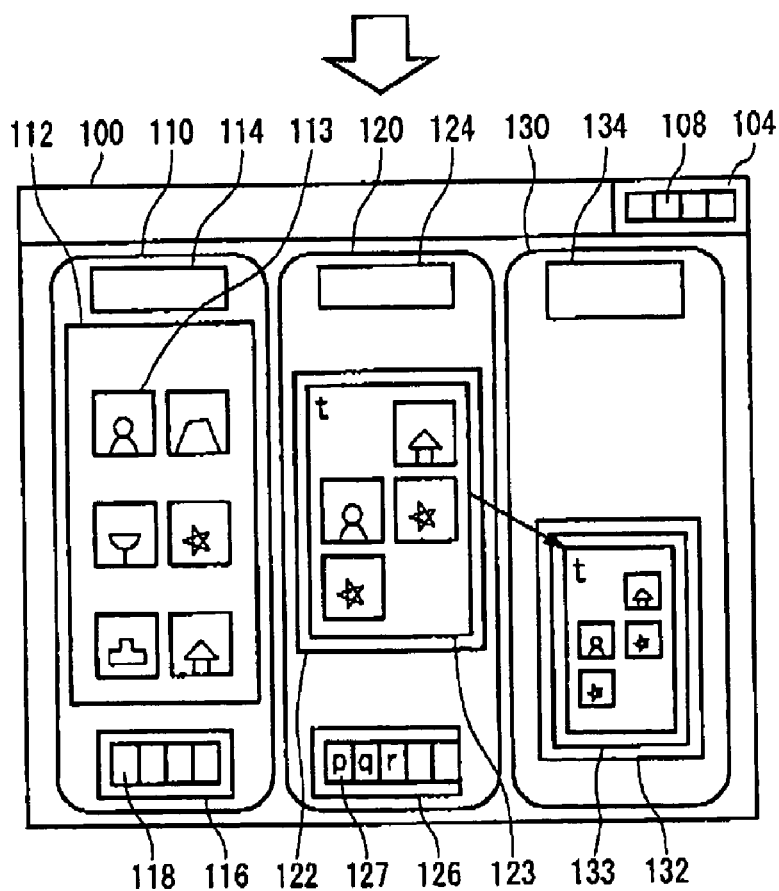
Figure 13:
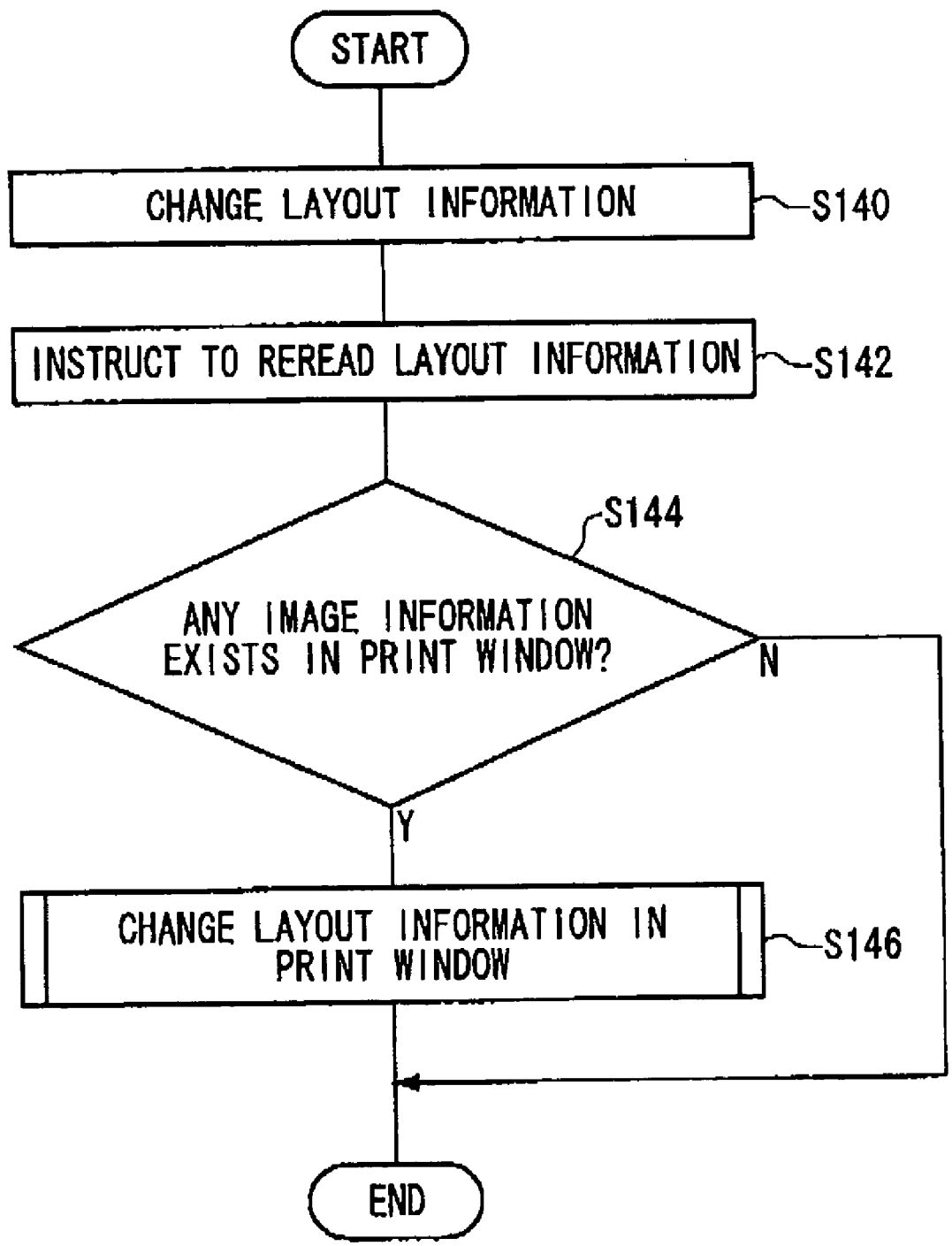
FIG. 13 is a flowchart showing an operation to update the display screen by the change reflecting section 240.

FIG. 12A and FIG. 12B are schematic views showing an example of the display screen displayed on the display 12 by the change reflecting section 240. Here, FIG. 12A shows a display screen which has not updated by the change reflecting section 240 yet. FIG. 8B shows a display screen which has been updated by the change reflecting section 240. FIG. 13 is a flowchart showing an operation to update the display screen by the change reflecting section 240.

As shown in FIGS. 12A and 12B, the change reflecting section 240 changes an editing layout 123*t* of the layout information 320 displayed in the print window 130 according to the flowchart shown in FIG. 13 when the layout information 320 is changed in the layout processing.

The flowchart shown in FIG. 13 is started at the state shown in FIG. 5. For example, the layout information 320 is changed from the state shown in FIG. 5. Here, the layout processing section 220 changes the layout information 320 based on the operation of the user 24.

In this case, the layout processing section 220 generates display data based on the layout information 320 and changes the editing layout 123*t* displayed on the display 12 (S140). For example, when the editing layout 123*s* shown in FIG. 5 is selected from a layout list display area 126 in a layout window 120 and changed the same to the other template, the layout processing section 220 generates display data based on the changed layout information 320 and passes the same to the layout main display section 222. The layout main display section 222 displays the editing layout 123*t* shown in FIG. 12A on the layout window 120. Additionally, the layout processing section 220 notifies the browse window 140 that the layout information 320 is changed. The layout processing section 220 may include the layout ID of the layout information 320. Additionally, the layout processing section 220 updates the template ED among the layout information 320 stored in the layout information storage section 260.

Next, the change reflecting section 240 receives the notification of the change from the layout processing section 220 and instructs the print processing section 230 to reread the layout information 320 (S142). The browse sub-window 140 may include the layout ID of the layout information 320, for example.

The print processing section 230 determines whether the changed layout information 320 is displayed in the print window 130 based on the instruction (S144). For example, the print processing section 230 compares the layout ID of the layout information 320 in the memory region on which the display data of the print window 130 is stored, and may determine that the layout information 320 exists in the print window 130 provided that at least one value of the layout IDs in the memory region is corresponded to the layout ID of the layout information 320.

When the layout information 320 is displayed in the print window 130 in the step S144 (S144: Yes), the print processing section 230 causes the print main display section 232 to change the layout information 320 displayed in the print window 130 (S146). Therefore, the editing layout 123*t* displayed on a print preview 133 in the print window 130 is changes as shown in FIG. 12B.

Meanwhile, when the layout information 320 is not displayed on the print window 130 in the step S144 (S144 No), the print processing section 230 ignores the instruction from the change reflecting section 240. Thus, the flowchart is ended.

As described above, when the layout information 320 is changed in the layout processing, the editing layout 123t of the layout information 320 displayed in the print window 130 is changed. Therefore, the user 24 can recognize that the change of the upstream processing affects the downstream processing.

Figure 14:
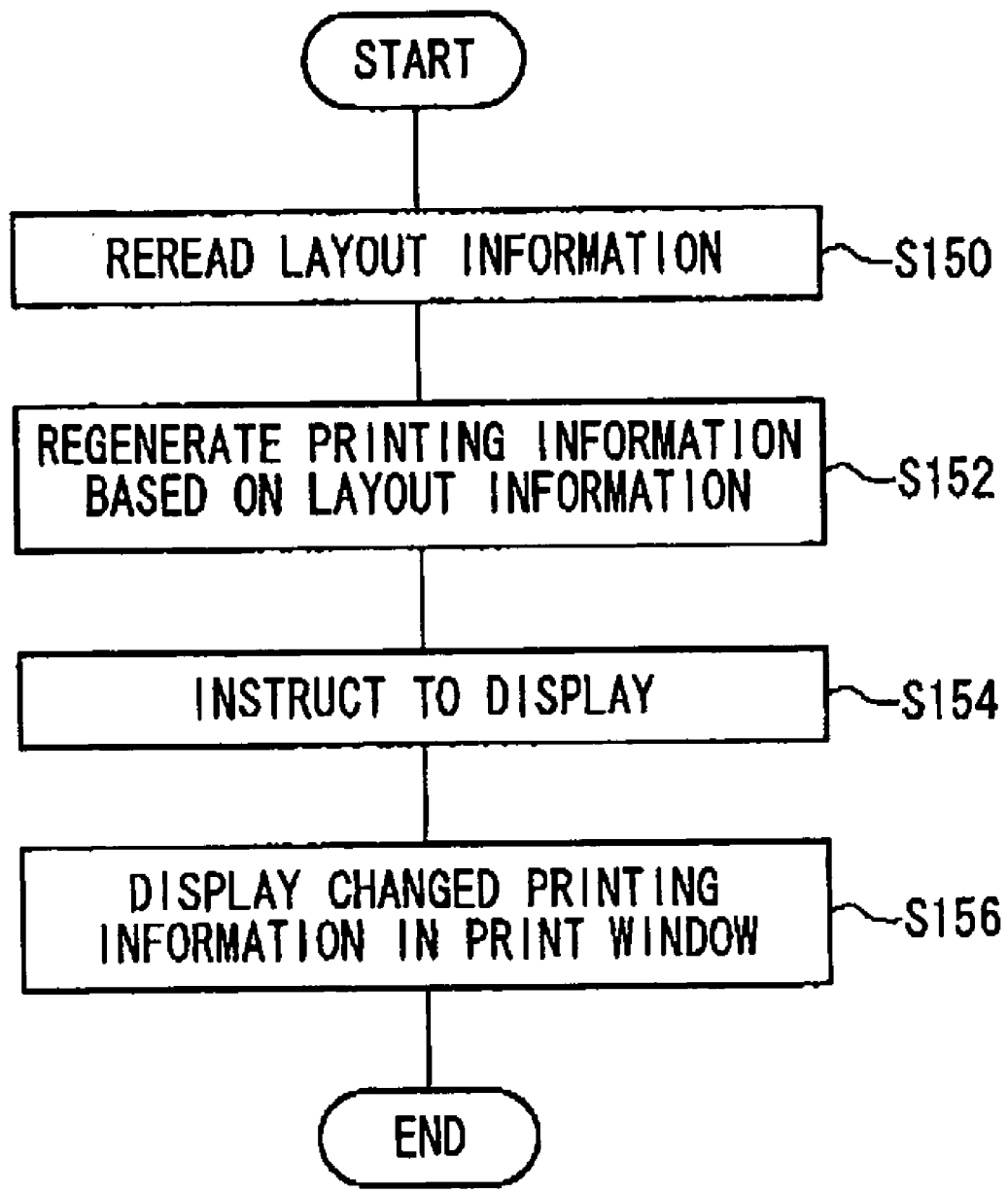
FIG. 14 is a flowchart showing in detail an operation of step S146 of FIG. 13.

FIG. 14 is a flowchart showing in detail an operation of step S146 of FIG. 13. The print processing section 230 reads the layout information 320 with the layout ID from the layout information storage section 260 into the memory region on which the display data is stored (S150). The print processing section 230 regenerates the display data on the memory region based on the read layout information 320 (S152). As fox the information used to regenerate the display data, such as the image information 310, the template information 340, the printing information 330 or the setting information 350 in addition to the layout information 320, the print processing section 230 utilizes the existing information on the memory region or reads the information from the layout information storage section 260 and the printing information storage section 270. The print processing section 230 instructs the print main display section 232 to display the printing information 330 on the memory region (S154). The print main display section 232 displays the content of the memory region on a printing information display area 132 in a print window 130 as a print preview 133 (S156). Thus, the flowchart is ended.

Figure 15A:
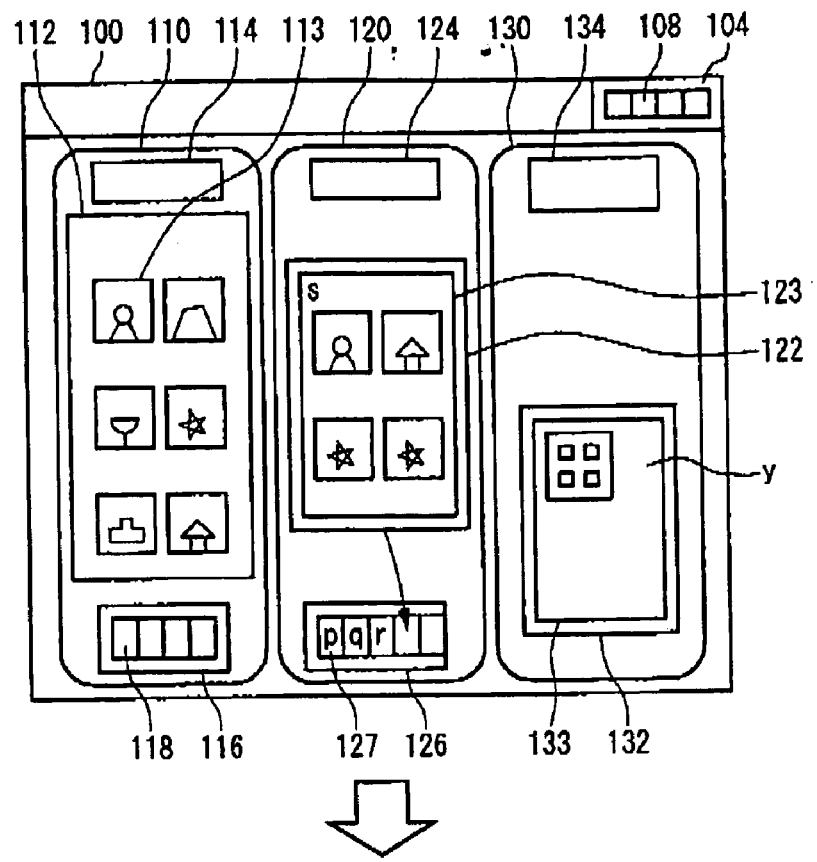
FIG. 15A and FIG. 15B are schematic views showing an example of the display screen displayed on the display 12 by the change reflecting section 240.
Figure 15B:
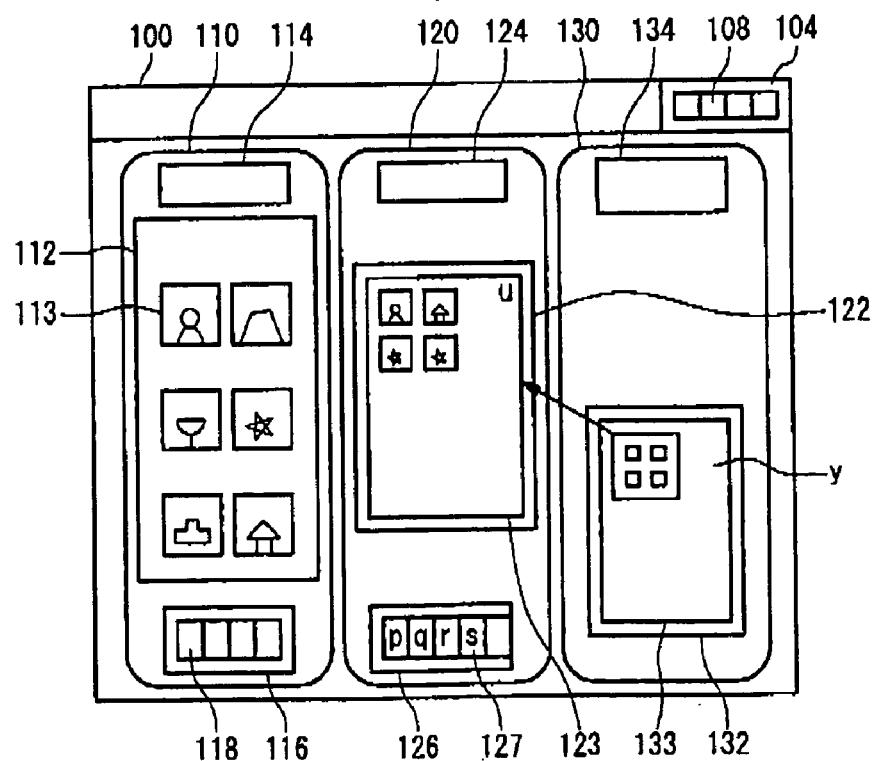
Figure 16:
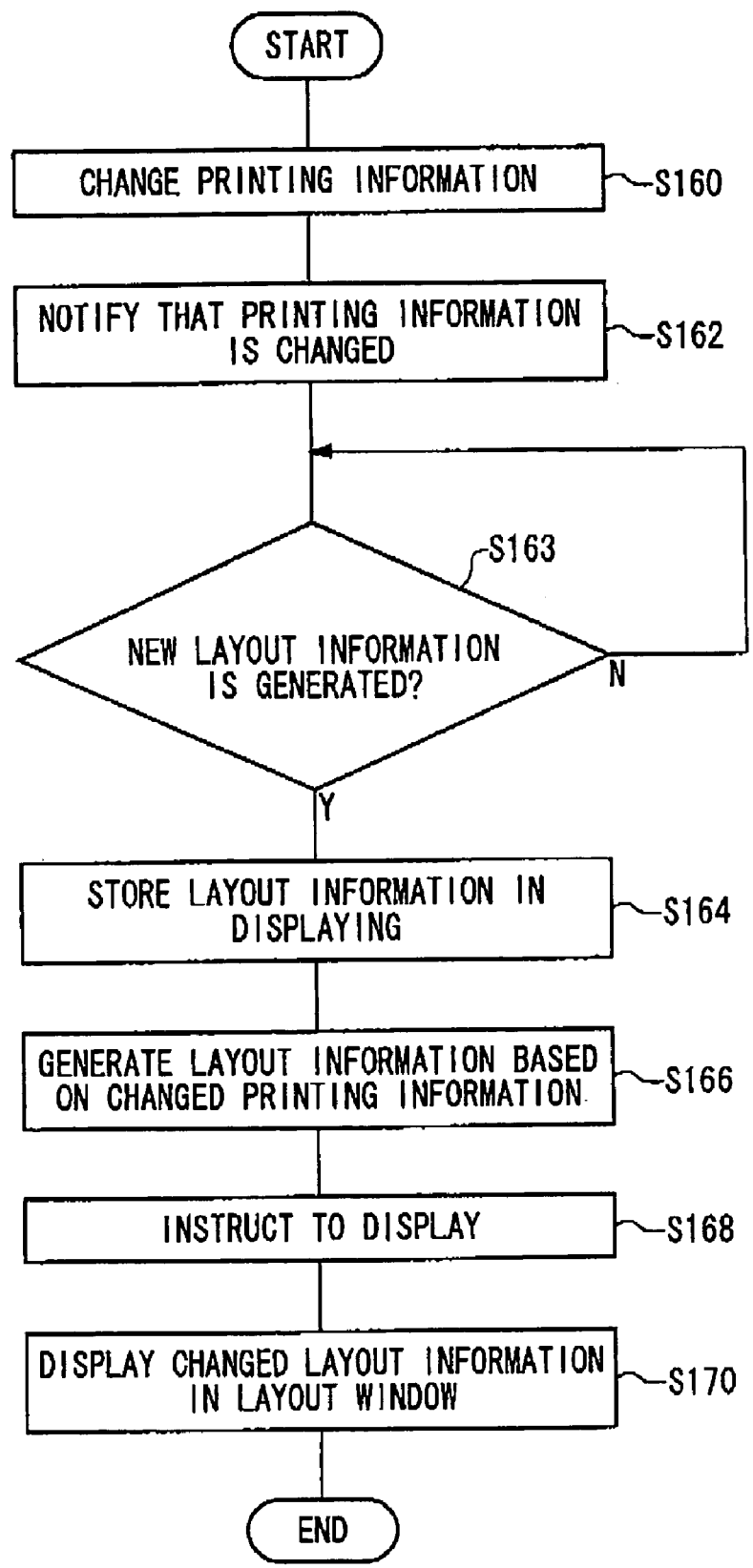
FIG. 16 is a flowchart showing that a layout processing section 220 generates a new layout information 320 based on an instruction from the change reflecting section 240 to update the display screen.

FIG. 15A and FIG. 15B are schematic views showing an example of the display screen displayed on the display 12 by the change reflecting section 240. Here, FIG. 15A shows a display screen on a new layout information has not been generated yet FIG. 15B shows a display screen on which a new layout information has been generated. FIG. 16 is a flowchart showing that a layout processing section 220 generates new layout information 320 based on an instruction from the change reflecting section 240 to update the display screen.

As shown in FIG. 15A and FIG. 15B, the change reflecting section 240 causes the layout processing section 220 to generate the new layout information 320 according to the flowchart shown in FIG. 16 when the printing information 330 is changed in the printing processing.

The flowchart shown in FIG. 16 starts at the state shown in FIG. 5. For example, the printing information 330 is changed from the state shown in FIG. 5. Here, the print processing section 230 changes the printing information 330 based on the operation of the user 24.

The print processing section 230 changes the printing information 330, generates display data based on the changed printing information 330 and passes the same to the print main display section 232 (S160). The print main display section 232 displays a print preview 133 changed based on the display data generated in the print processing section 230 in a print window 130. Additionally, the print processing section 230 notifies the change reflecting section 240 that the printing information 330 has been changed (S162).

Next, the layout main display section 222 waits until user 24 instructs the layout main display section 222 to generate a new layout information 320 (S163: No). Then, when the user 24 does not instruct to generate the new layout information 320, any new layout information 320 is not generated, and the layout main display section 222 continues to display the editing layout 123s based on the current layout information 320 on the display 12.

Meanwhile when the user 24 instructs to generate a new layout information 320 in the step S163, the layout processing section 220 stores the current layout information 320 in the layout information storage section 260 (S164). Next, the change reflecting section 240 causes the print processing section 230 to generate a new layout information 320 based on the changed printing information 330 (S166). For example, when the paper size as the printing information 330 is changed, the change reflecting section 240 notifies the print processing section 230 that the print processing section 230 should limit to set the paper size. The layout processing section 220 generates a new layout information 320 based on the notification and the instruction from the user 24.

Next, the layout processing section 220 instructs the layout main display section 222 to display an editing layout 123 based on the layout information 320 newly generated on the display 12 (S168). According to the instruction, the layout main display section 222 displays an editing layout 123u based on the new layout information 320 in a layout window 120(S170). Thus, the flowchart is ended.

As described above, when any change is occurred in the downstream processing, the changed processing can be performed from upstream next time without wasting the upstream processing.

Here, each of the browse processing section 210, the layout processing section 220 and print processing section 230 has the memory to develop the display data in the above-described embodiment. However, it is not listed to those, and each of the browse main display section 212, the layout main display section 222 and the print main display section 232 may have the memory to develop the display data. In this case, the change reflecting section 240 may notify the browse main display section 212, the layout main display section 222 and the print main display section 232 that the layout information 320 and the printing information 330 are changed.

Figure 17:
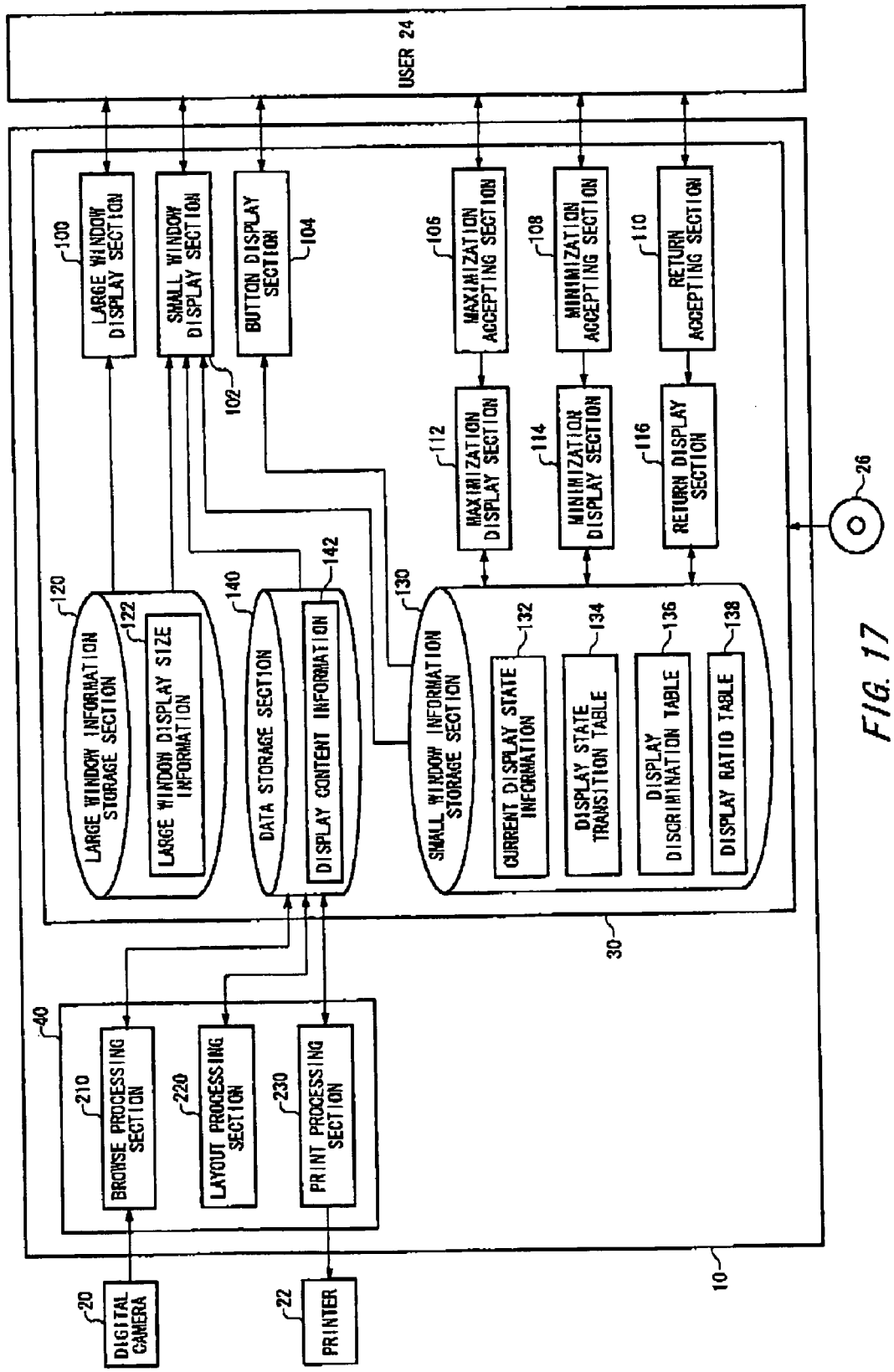
FIG. 17 is a functional block diagram explaining the function of an image processing apparatus 10 according to a second embodiment of the present invention.

FIG. 17 is a functional block diagram explaining the function of an image processing apparatus 10 according to a second embodiment. Here, the image processing apparatus 10 according to the present embodiment has the function and the configuration substantially same as those of the components with same reference numerals of the image processing apparatus 10 according to the first embodiment, so that the description is omitted except for the difference.

Figure 18:
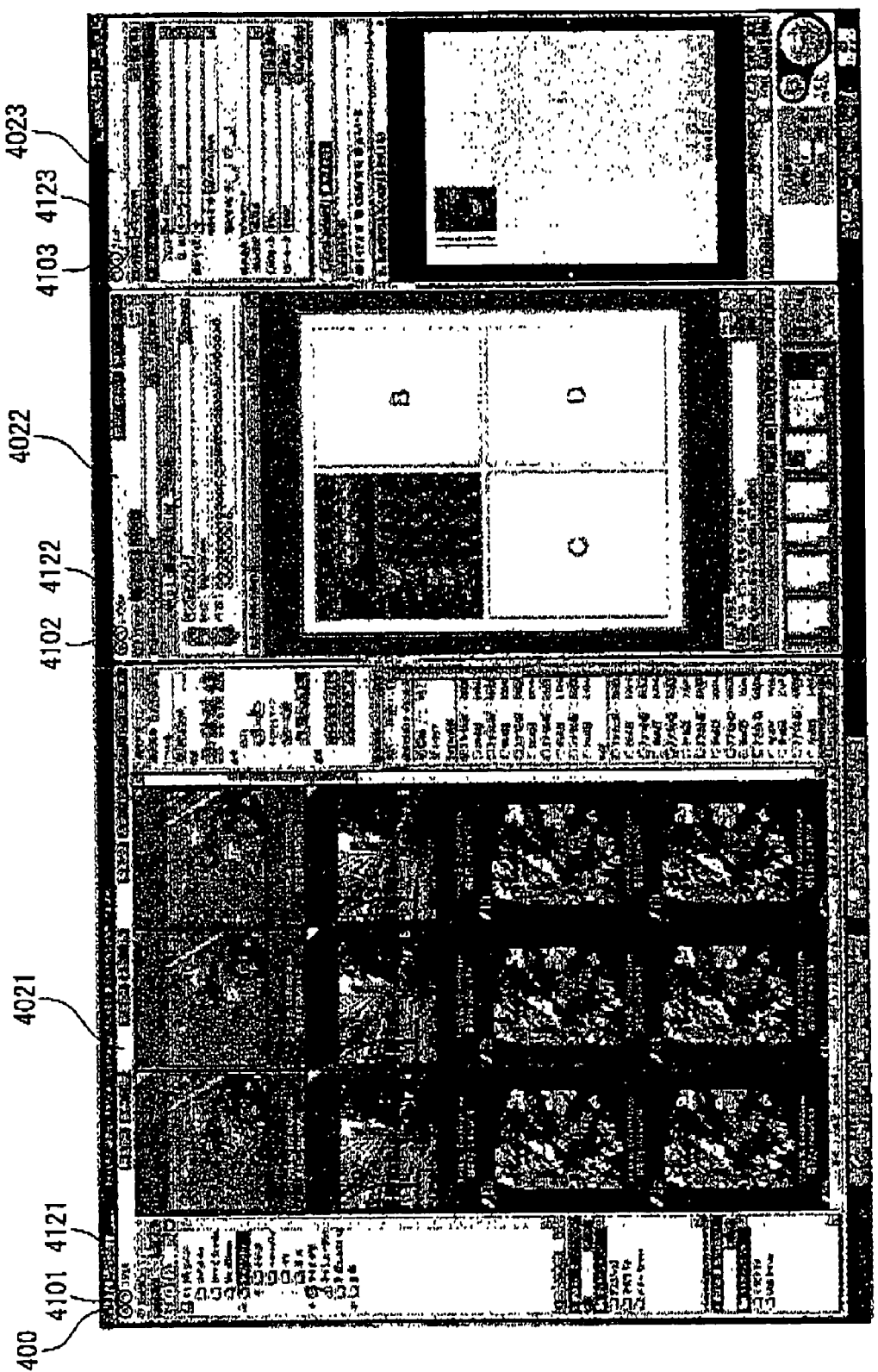
FIG. 18 shows an example of a display screen displayed by a user interface section 30 of the image processing apparatus 10 according to a second embodiment of the present invention.
Figure 19:
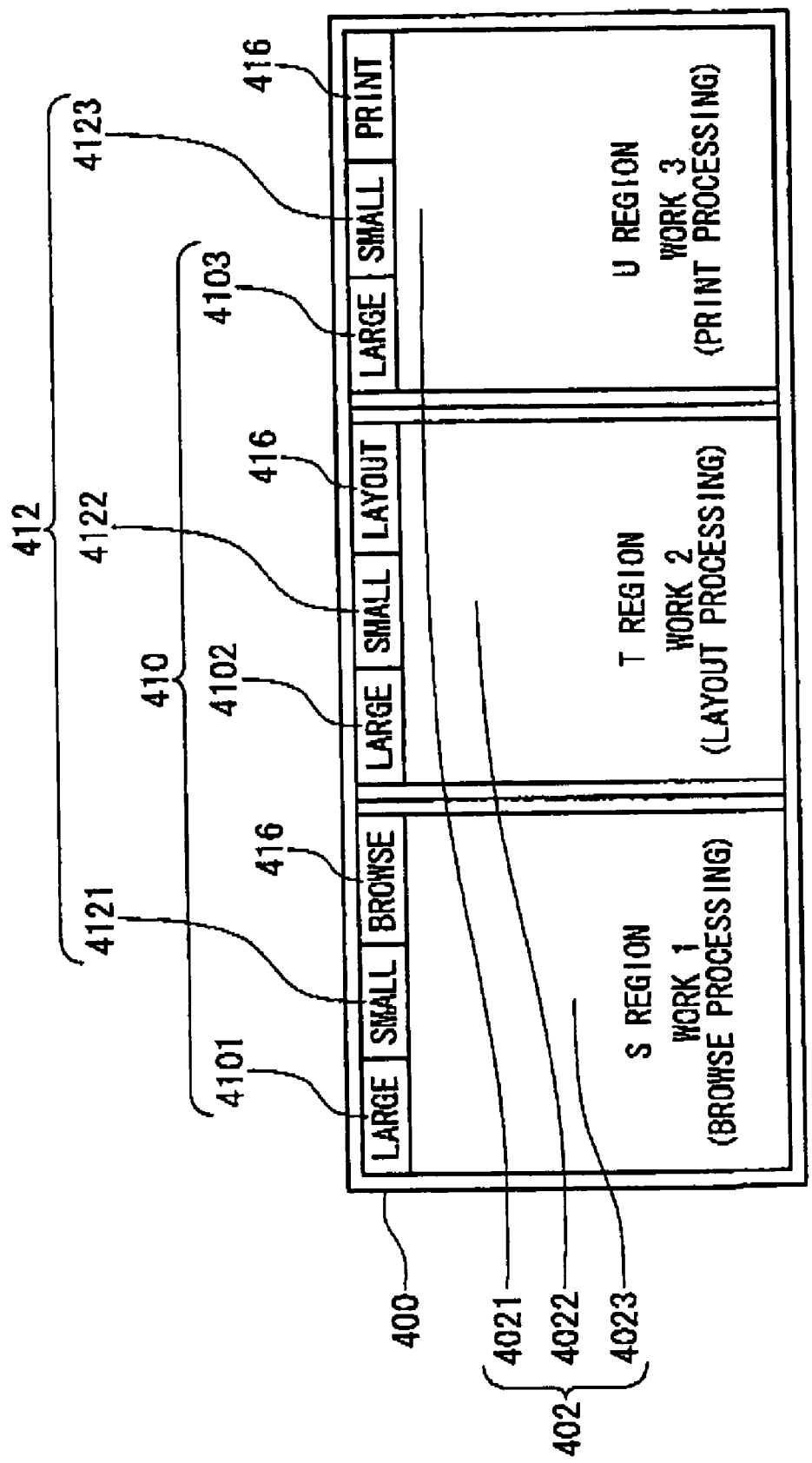
FIG. 19 is a schematic view of FIG. 18.
Figure 20:
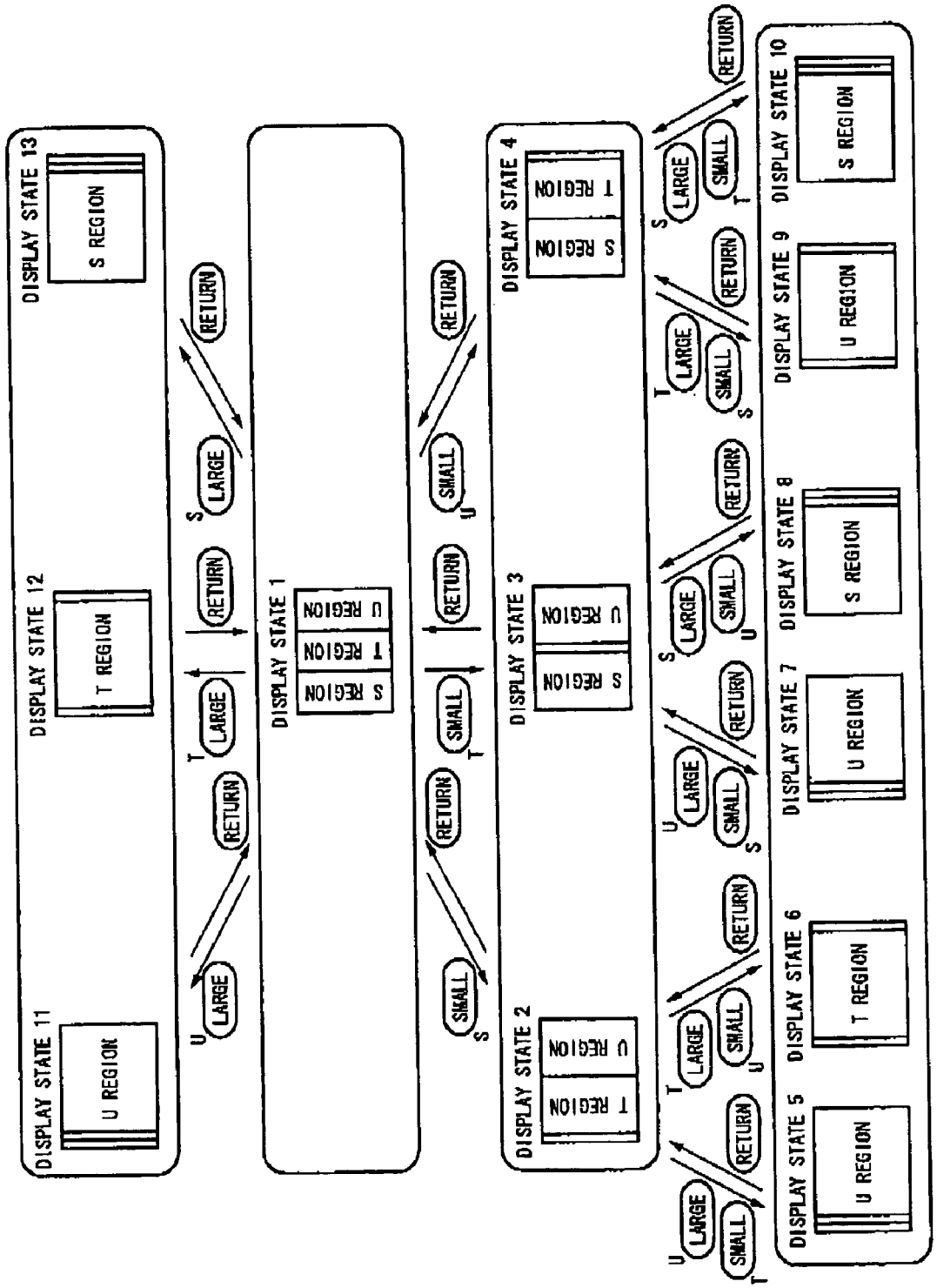
FIG. 20 shows the relationship of the display state of small windows 402.

FIG. 18 is a functional block diagram explaining the function of the image processing apparatus 10 according to the present embodiment. FIG. 19 shows an example of a display screen displayed by a user interface section 30 of the image processing apparatus 10. FIG. 20 is a schematic view of FIG. 19.

The image processing section 40 includes a browse processing section 210 for acquiring image information from a digital camera 20 and thumbnail-displaying the same on a display 12, a layout processing section 220 for generating layout information by allocating the image information and a print processing section 230 for generating printing information based on the layout information and outputting the same to a printer 22. The browse processing section 210 stores the image information displayed on the display 12 in a data storage section 140 in the after described user interface section 30 as display content information 142. In the same way, the layout processing section 220 and the print processing section 230 store the generated layout information and printing information as the display content information 142 in the data storage section, respectively.

The user interface section 30 includes a large window display section 100 for displaying a large window 400 for the whole application shown in FIG. 18 and FIG. 19 on a display screen of the display 12, a small window display section 102 for displaying a small windows 402 in the large window 400 displayed on the display screen, a button display section 104 for displaying a maximization button 410 and a minimization button 412 in the small window 402, the data storage section 140 for receiving the display content information 142 to be displayed on the large window 400 and the small windows 402 from the image processing section 40 and storing the same The large window display section 100 displays a large window button region 404 having a button to operate the whole application. For example, the button to operate the whole application includes an end button for ending the application and a minimization button for minimizing the whole application and displaying the same.

The small window display section 102 arranges a browse processing small window 4021, a layout processing small window 4022, and a print processing small window 4023 corresponding to each work of browse processing, layout processing and print processing, respectively in one direction (lateral direction in FIG. 18 and FIG. 19) based on the display content information 142 stored in the data storage section 140, and displays the same. The small window display section 120 further displays title display regions 416 having each processing name corresponding to the small windows 402 on each of the small window 402. The button display section 104 displays a S region maximization button 4101 and a S region minimization button 4121 in the browse processing small window 4021. Additionally, the button display section 104 displays a T region maximization button 4101 and a T region minimization button 4121 in the layout processing small window 4022. Then, the button display section 104 displays a U region maximization button 4103 and a U region minimization button 4123 in the print processing small window 4023. Further, the button display section 104 displays the after-described return buttons on each of the browse processing small window 4021, the layout processing small window 4022 and the print processing small window 4023. Here, for ease of explanation, the browse processing small windows 4021 is referred to as S region, the layout processing small window 4022 is referred to as T region and the print processing small window 4023 is referred to as U region in the following description.

The user interface section 30 further includes a maximization accepting section 106 for accepting an input indicating that any maximization button 410 is pushed, a minimization accepting section 108 for accepting an input indicating that any minimization button 410 is pushed and a return accepting section 110 for accepting an input indicating that any retain button is pushed. The user interface section 30 further includes a maximization display section 112 for extending the small windows 402 in the large window 400 and causing the small window display section 102 to display the same, a minimization display section 114 for mining the small windows 402 in the large window 400 and causing the small window display section 102 to display the same and a return display section 116 for returning the size of the small windows 402 to the original size before the small windows are displayed by the maximization display section 112 or the minimization display section 114. Here, the maximization display section 112, the minimization display section 114 and the return display section 116 will be described later.

The user interface section 30 fierier includes a large window information storage section 120 for storing information regarding the display of the large window 400 and a small window information storage section 130 for storing information regarding the display of the small windows 402. The large window information storage section 120 stores a large window display size information 122 indicative of the size of the display of the large window 400 as the information regarding the large window 400. For example, the large window display size information 122 may be an integer value obtained by counting each of the number of pixels of the lengthwise size and the crosswise size of the large window 400. The small window information storage section 130 stores a display state transition table 134, a display discrimination table 136, a display ratio table 138 and a current display state information 132. Here, the display ratio table 138 represents the ratio of each size of the small windows 402 to the large window 400. In the present embodiment, the display ratio table 138 includes each ratio (p,q,r) of the browse processing small window 4021, the layout processing window 4022, and the print processing small window 4023, and a value (a) indicating the size of the minimized window by the absolute number of pixels. Due to setting the size of the minimized window by the absolute value, the presence of the minimized small window 402 can be certainly recognized by the user 24 even if the large window is small. Here, the display state transition table 134, the display discrimination table 136 and the current display state information 132 will be described later.

A recording medium 26 stores a program at least causes the user interface 30 to operate. Here, the program stored in the recording medium 26 is installed in a personal computer 14, so that a personal computer 14 may cause the user interface 30 to operate. Additionally, the personal computer 14 may obtain such program through a communication line.

FIG. 20 shows the relationship of the displaying state of small windows 402 displayed by the small window display section 102 based on the maximization display section 112, the minimization on display section 114 and the return display section 116. In FIG. 5, encircled words "LARGE", "SMALL" and "RETURN" and associated letters "S""T" and "U" indicate that the maximization button 410, the minimization button 412 and the return button for each of "S" (brose processing small window), "T" (layout processing small window) and "U" (print processing small window) a pushed.

For example, in the state that the small window display section 102 indicates a display state 1, the minimization accepting section 108 accepts an input indicating that a S region minimization button 4121 in the S region is pushed. In this case, the minimization accepting section 108 causes the small window display section 102 to display a display state 2 as shown in FIG. 20. That is to say, the minimization display section 114 minimizes the S region in which the T region minimization button 4122 is displayed in the large window 400, extends the T region and the U region to a space generated by the minimization in the large window 400 and causes the small window display section 102 to display the same.

As shown in FIG. 20, when the minimization accepting section 108 accepts an input indicating that the minimization button 412 displayed on one small window 402 is pushed, the minimization display section 114 minimizes the one window 402 in the large window 400 and causes the small window display section 102 to display the same. Additionally, the minimization display section 114 extends at least one of the small windows 402 except for the one small window 402 in the large window 400 to a space generated by the above-described minimization and causes the small window display section 102 to display the same.

Then, the minimization display section 114 displays the small windows 402 as holding the arrangement in one direction (lateral direction in FIG. 20) after minimizing and extending the small windows 402. Therefore, the position of the small windows 402 in the whole application can be recognized by the user 24 when the small windows are minimized and extended. Additionally, minimizing the small windows 402, the minimization display section 114 reduces the small windows in the arranging direction (lateral direction in FIG. 20) and displays the same. Thereby the position of the small windows 402 in the whole application can be more certainly recognized by the user 24 when the small windows are minimized and extended.

Additionally as shown in FIG. 20, when the maximization accepting section 106 accepts an input indicating that a maximization button 410 displayed in one small window 402 is pushed, the maximization display section 112 minimizes the small windows 402 except for the one small window 402 in the large window 400 and causes the small window display section 102 to display the same. Then, the maximization display section 112 extends the one small window 402 to a space generated by the above-described minimization and causes the small window display section to display the same.

Then, the maximization display section 112 displays the small windows 402 as holding the arrangement in one direction (lateral direction) after minimizing and extending the small windows 402. Therefore, the position of the small windows 402 in the whole application can be recognized by the user 24 when the small windows are minimized and extended. Thereby the position of the small windows 402 in the whole application can be recognized by the user 24 when the small windows are minimized and extended. Additionally, minimizing the small windows 402, the maximization display section 112 reduces the small windows 402 in the arranging direction (lateral direction) and causes the small window display section to display the same. Thereby the position of the small windows 402 in the whole application can be more certainly recognized by the user 24 when the small windows are minimized and extended.

As described above, the small windows 402 can effectively displayed in the large window 400.

Figure 21:
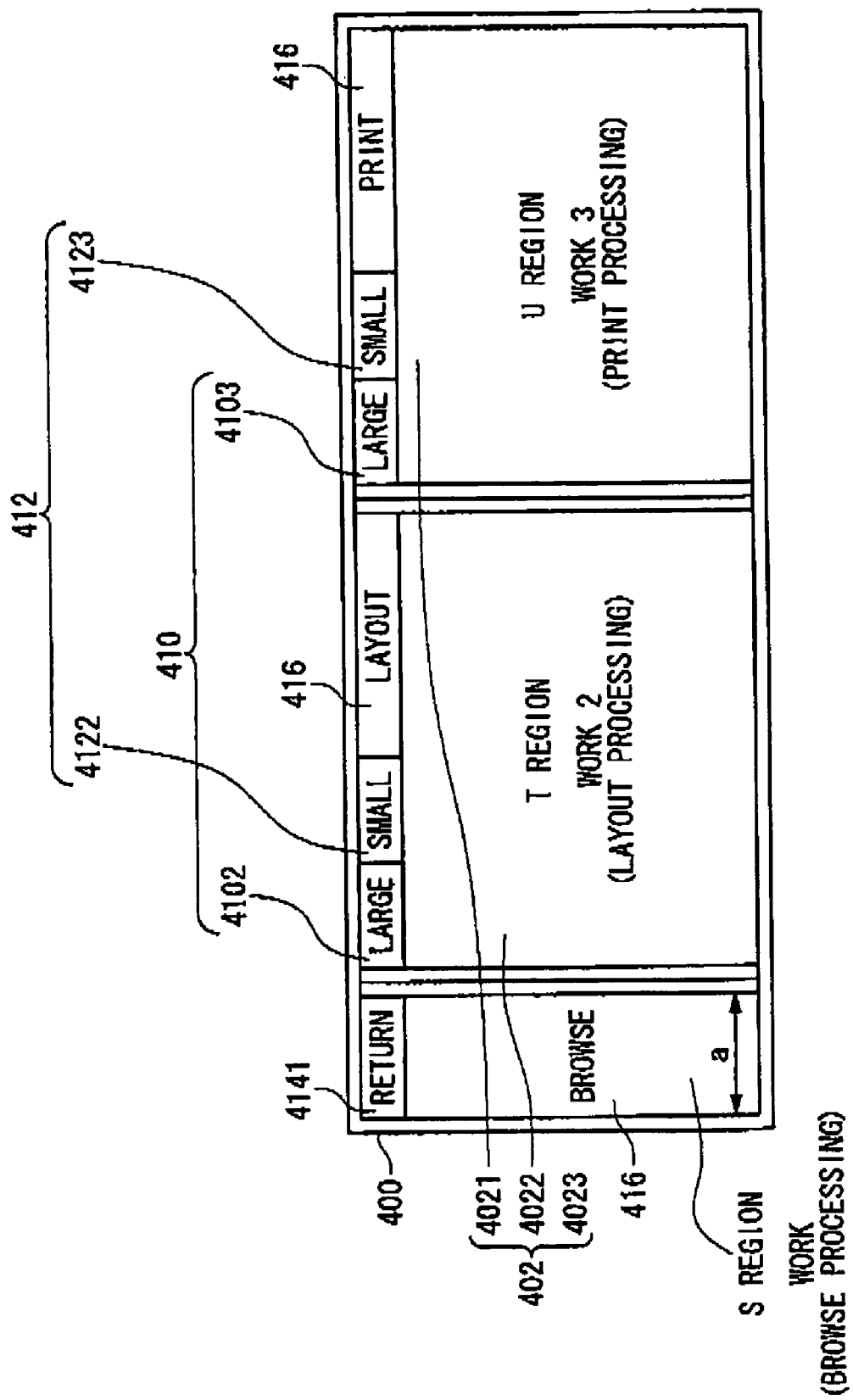
FIG. 21 is a schematic view of a display screen displayed by a small window display section 102 based on the display state 2 in FIG. 20.

FIG. 21 is a schematic view of a display screen displayed by a small window display section 102 based on the display state 2 in FIG. 20. In FIG. 21, the S region is minimized and displayed in the large window 400. When a small window 4023 is minimized, the name of a processing associated with the minimized small window 4023 is displayed on the small window 4023. Thereby the processing associated with the minimized window can be recognized by the user 24. Additionally, the button display section 104 displays the S region return button 4141 in the S region.

Now, further the operation of the user interface 30 will be described with reference to FIG. 22-FIG. 25. FIG. 22 shows an example of the display state transition table 134 stored in a small window information storage section 130. The display state transition table 134 has post-transition display state information associated with the pushed button and the current display state information. Here, the post-transition display state information associated with the pushed button and the current display state information in the display state transition table 134 is corresponded to each button described in FIG. 20 and the display state changed by the buttons. For example in FIG. 22, when the minimization button "Small(S)" in the S region is pushed as well as in FIG. 22 and the current display state information displayed on the display 12 is "1", the associated post-transition state information is "2".

FIG. 23 shows an example of a display discrimination table 136 stored in the small window information storage section 130. The display discrimination table 136 has a small window display state and a button display state associated with the display state information.

Here, "Ratio" in the small window display state indicates that the small windows are displayed at a ratio determined by the display ratio table 138, "Min." indicates that the small windows minimized by the absolute value determined by the display ration table 138 is displayed, and "Max." indicates that the small windows are displayed in a space except for the region occupied by the mimed small window. For example, the display state of the small window in the state information 2 in the display discrimination table 136 indicates that the S region is minimized by the absolute value determined by the display ratio table 138 and displayed, and the T region and the U region are displayed on the region except for the S region in the large window 400 at the ratio q and r determined by the display ration table 138 as shown in FIG. 21.

Additionally, "Dis" in the button display state indicates that the button is displayed and an input from the user 24 is accepted. "–" indicates that the button is not displayed and any input from the user 24 is not accepted. For example, the button display state in the state information 2 in the display discrimination table 136 indicates that the return button 4141 is displayed in the S region, and the T region maximization buttons 4102 and 4103 and the T region minimization buttons 4122 and 4123 are displayed in the T region and the U region, respectively.

Figure 24:
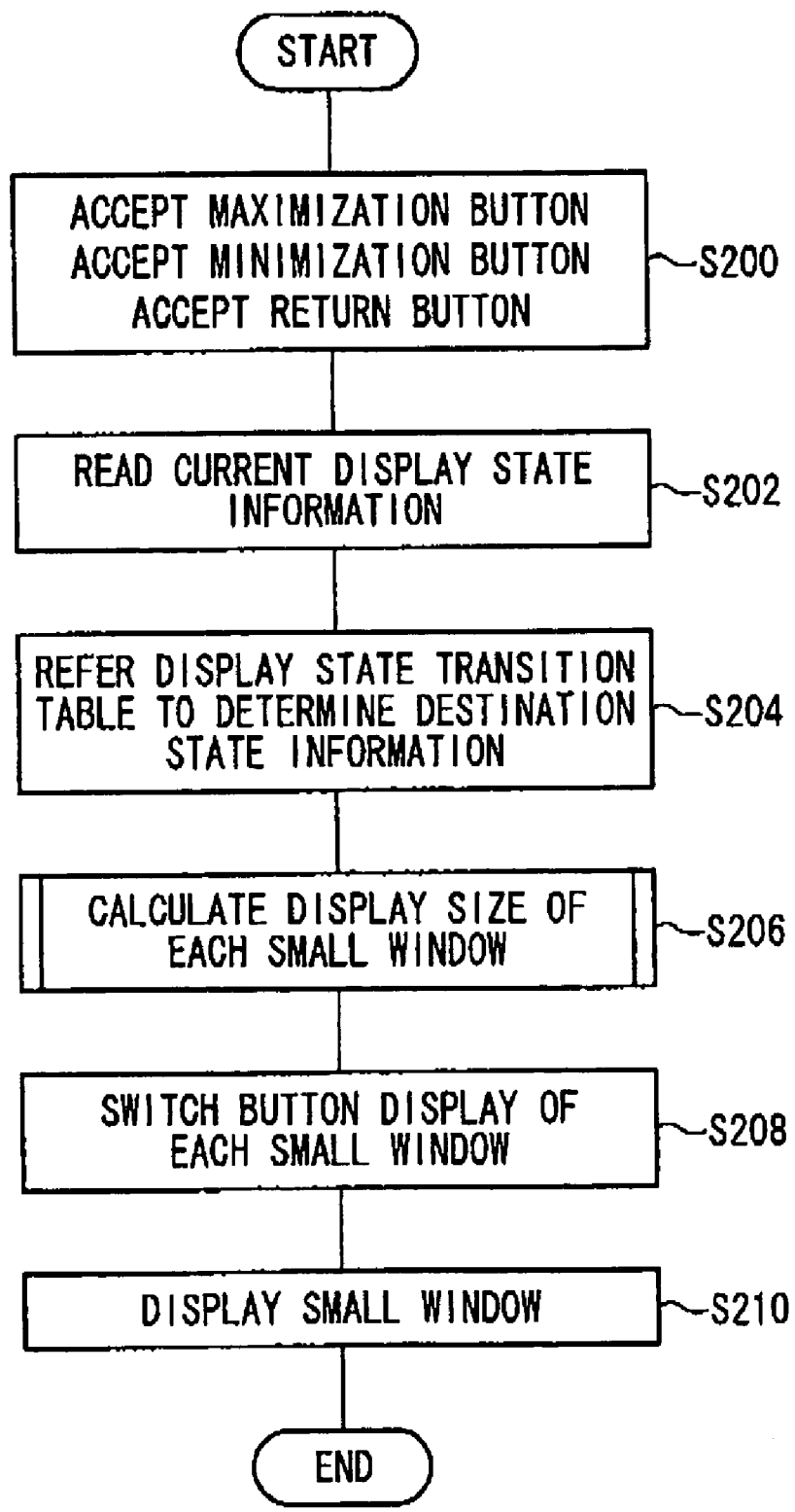
FIG. 24 is a flowchart of the operation to display the small windows 402 in a large window 400 by a user interface section 30.

FIG. 24 is a flowchart of the operation to display the small window 402 in a large window 400 by a user interface section 30. In the present embodiment, each flow of the maximization accepting section 106, the minimization accepting section 108 and the return accepting section 110 is substantially same, therefore, the operation of the maximum accepting section 106 will be described now.

The flowchart is started at the state that the large window 400 and the small windows 402 are displayed in the display 12. Here, the small window display section 102 may display the small windows 402 based on the display state 1 as the initial state.

When the user 24 pushes the maximization button 410 through the keyboard 16 or the mouse 18, the maximization accepting section 106 accepts an input indicating that the maximization button 410 is pushed and notifies of that the maximization display section 112 (S200). In this case, the maximization accepting section 106 also notifies the maximization display section 112 of the information indicating which of the maximization buttons 410 of the S region, the T region and the U region has been pushed.

Firstly, the maximization display section 112 reads the current display state information 132 in the small window information storage section 130 based on the notification from the maximization display section 112 (S202). Next, the maximization display section 112 refers the display state transition table 134 in the small window information storage section 130 and determines post-transition state information associated with the region notified by the maximization display section 112 and the current display state information 132 read from the small window information storage section 130 (S204). Next, the maximization display section 112 overwrites the current display state information 132 by the determined post-transition state information. Here, the current display state information 132 may include "1" as the initial display state information.

Next, the maximization display section 112 calculates the size of displaying each small window 402 in the large window 40 based on the determined post-transition state information (S206). Additionally, the maximization display section 112 refers the display discrimination table 136 in the small window information storage section 130, reads the display state of the button associated with the post-transition state information and switches the button to be displayed in each small window 402 (S208). Then, the maximization display section 112 notifies the small window display section 102 and the button display section 104 of redisplaying. The small window display section 102 and the button display section 104 display the small windows 402 in the large window 400 based on the size of the small windows and the button determined by the maximization display section 112 (S208). Thus, the flowchart is ended. Here, the operation of the minimization display section 114 and the return display section 116 are same as that of the maximization display section 112 except for starting the operation of the step S204 by the notification from the minimization accepting section 108 and the return accepting section 110, and referring the button in the display transition table 134, so that the description is omitted.

Figure 25:
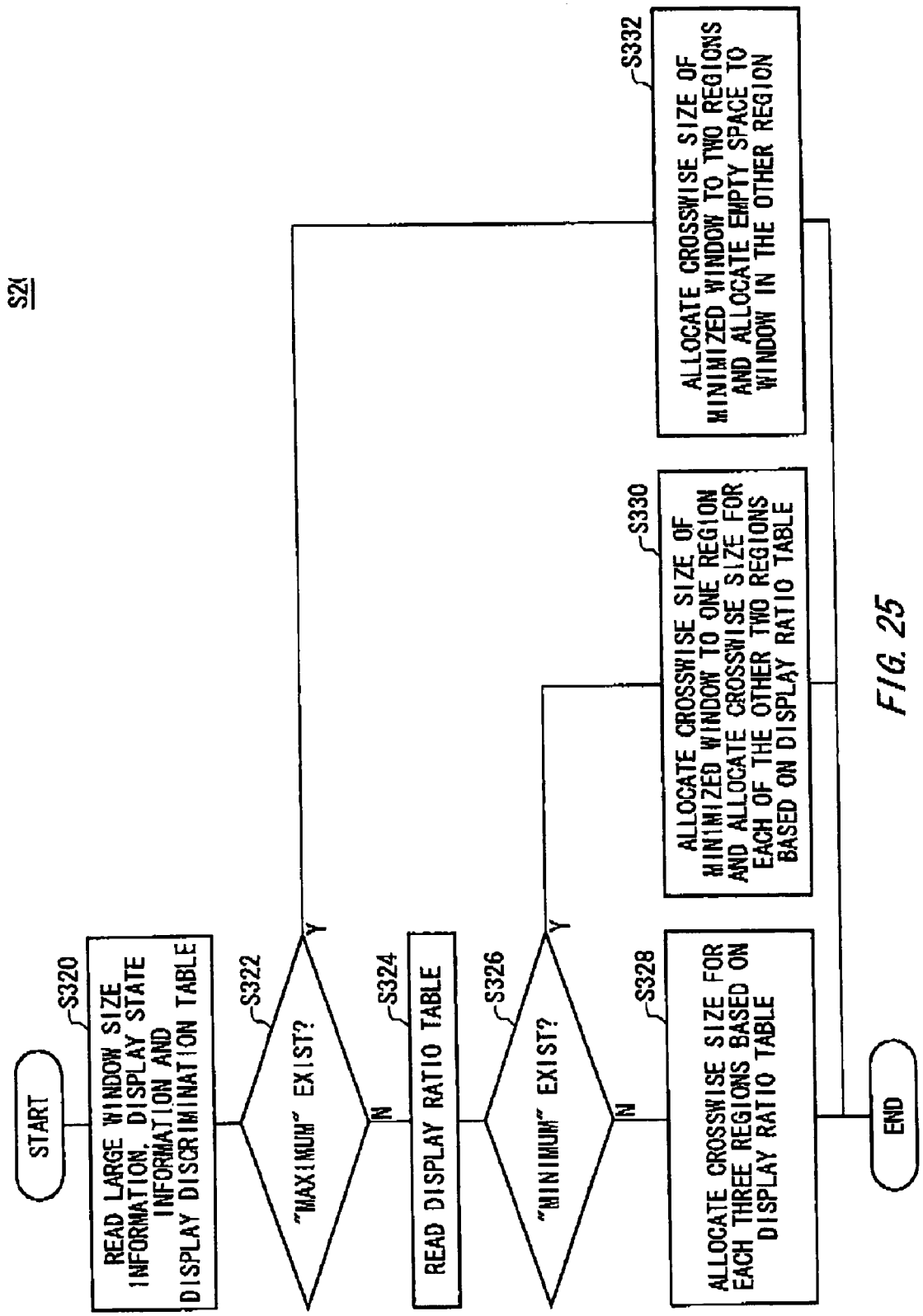
FIG. 25 is a flowchart showing the detailed operation of S206 in FIG. 24.

FIG. 25 is a flowchart showing the detailed operation of S206 in FIG. 24. Firstly, the operation of the maximization display section 112 will be described as well as in FIG. 24. The maximization display section 112 reads the large window display size information 112 stored in the large window information storage section 120, the determined display state information and the display discrimination table 136 stored in the small window information storage section 130 (S320). Next, the maximization display section 112 determines whether there is "Maximum" in the display state of the small windows in the display state discrimination information associated with the determined display state information (S322).

When there is "Maximum" in the step S322 (S322: Yes), the maximization display section 112 allocates the crosswise size of the minimized window in the display ratio table 138 to two regions except for the "Maximum" region (S332). Then, the maximization display section 112 allocates the crosswise size of the "Maximum" window to a space generated by allocating the two regions to the minimized window in the crosswise size of the large window 400 read from the large window display size information 122. Thereby each crosswise size of three small windows is determined.

Meanwhile, there is not "Maximum" in the step S322 (S322: No), the maximization display section 112 reads the display ratio table 138 stored in the small window information storage section 130 (S324). Next, the maximization display section 112 determines whether there is "Minimum" in the display state of the small windows in the display discrimination table 136 associated with the determined display state information (S326).

When there is "Minimum" in the step S326 (S322: Yes), the maximization display section 112 allocates the crosswise size of the minimized window in the display ratio table 138 to the "Minimum" region (S330). Then, the maximization display section 112 allocates each crosswise size of the two other regions to a space generated by allocating the crosswise size of the minimized window in the crosswise size of the large window 400 read from the large window display size information 122 at the ratio of the display ratio table 138. Thereby each size of three small windows is determined.

Meanwhile, when there is not "Minimum" in the step S326 (S326: No), the maximization display section 112 allocates the crosswise size of the small windows in the three regions to the crosswise size of the large window 400 read from the large window display size information 122 at the ratio of the display ratio table 138 (S328). Thus, the flowchart is ended. Here, lengthwise size is not changed in the flowchart.

Hereinbefore, the operation of the maximization display section has been described. The operation of the minimization display section 114 and the return display section are same as that of the maximization display section, so that the description is omitted.

As described above, the small windows 402 can be minimized and maximized in the large window 400 without increasing the number of operations by the user 24. Thereby the small windows 402 can be effectively displayed in the large window 400. Additionally, when the small windows 402 are minimized and maximized, the position of the small windows 402 in the whole application can be recognized by the user 24.

Here, three small windows in the image processing application have been described in the present embodiment. However, it is not limited to the image processing application regarding the type of the application. Additionally, the number of small windows may be more than four.

Additionally, the small windows 402 are arranged crosswise, and minimized and maximized in a crosswise direction in the present embodiment. However, the small windows 402 may be minimized and maximized in a longitudinal direction.

Additionally, the absolute value is allocated to the minimized window in the present embodiment, but the allocation of the size of the minimized window is not limited to that. For another example, the size of the minimized window may be allocated by the ratio to the large window 400 or the ratio to the other regions.

Further, each of the maximization accepting section 106, the minimization accepting section 108 and the return accepting section 110 accepts the input indicating that the maximization button 410, the minimization button 412 and the return button 414 which are displayed by the button display section 104 are pushed in the present embodiment. However, each input form of the maximization, the minimization and the return is not limited to that. For another example, when a specified key of the keyboard 16 is operated, the input of the maximization, the minimization and the return may be accepted. In this case, a specified key display section instead of the button display section 104 or along with the button display section 104 may display the operation of the specified key on the display screen.

Figure 26:
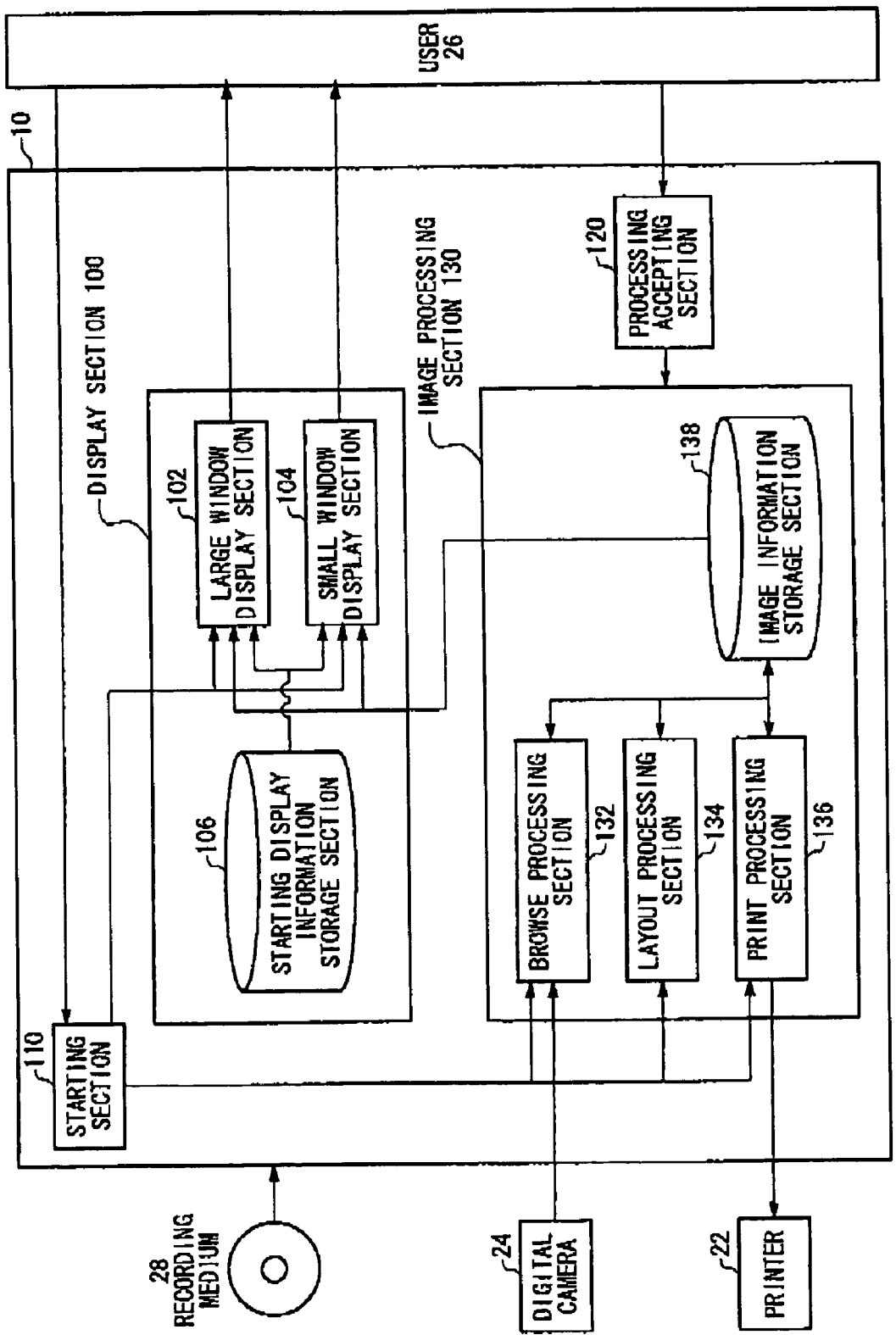
FIG. 26 is a functional block diagram explaining the function of an image processing apparatus 10 according to a third embodiment of the present invention.
Figure 27:
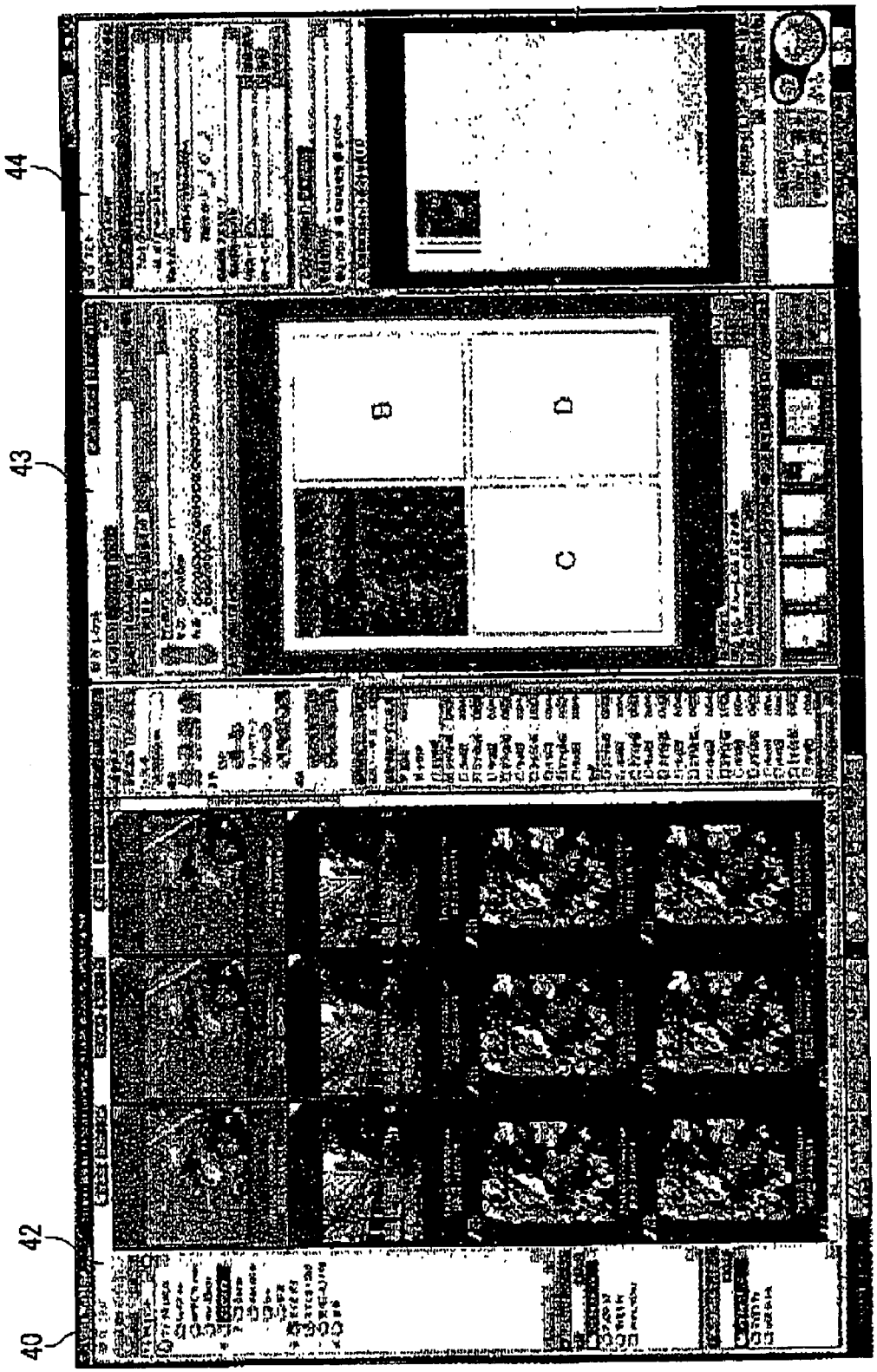
FIG. 27 shows an example of a display screen 14 displayed by a display section 100 of the image processing apparatus 10 according to a third embodiment of the present invention.

FIG. 26 is a functional block diagram explaining the function of an image processing apparatus 10 according to a third embodiment. FIG. 27 shows an example of a display screen 14 displayed by a display section 100 by the image processing apparatus 10. Here, the image processing apparatus 10 according to the present embodiment has the function and the configuration substantially same as those of the components with same reference numerals of the image processing apparatus 10 according to the first and second embodiments, so fiat the description is omitted except for the difference.

The starting section 110 accepts an instruction to start the image processing application from the user 26 through a personal computer 16 and a keyboard 18. When the starting section 110 accepts the instruct to start the image processing application, the starting section 110 notifies the display section 110 and the image processing section 130 of that. In this case, the starting section 110 may display an icon indicative of the image processing application before starting, detect that the icon is clicked by the keyboard 18 and receive the instruction to start the image processing application.

The image processing section 130 includes: a browse processing section 132 for acquiring image information from the digital camera 24 based on an instruction from the processing accepting section 120 and thumbnail-displaying on the display 12; a layout processing section 134 for allocating the image information to generate layout information; a print processing section 136 for generating printing information based on the layout information and outputting the same to a printer 22; and an image information storage section 138 for storing image information. The browse processing section 132 stores the image information displayed on the display 12 in the image information storage section 138. In the same way, the layout processing section 134 and the print processing section 136 stores the generated layout information and printing information in the image information storage section 138, respectively. Here, the browse processing, the layout processing and the print processing can be individually operated, but the image information is designated in the layout processing, and the layout information is designated in the print processing at least once. Therefore, the browse processing, the layout processing and the print processing are cooperated with each other as a workflow in the described order.

The display section 100 includes a large window display section 102 for displaying the large window 40 for the whole application shown in FIG. 27 on the display screen 14 of the display 12, a small window display section 104 for displaying a small window 42, 43 and 44 in the large window 40 displayed on the display screen 14 and a starting display information storage section 106 for storing starting display information referred when the large window 40 and the small windows 42, 43 and 44 are displayed on the display screen 14 at starting. In the present embodiment shown in FIG. 26 and FIG. 27, the small window display section 104 arranges three windows 42, 43 and 44 corresponding to each work of the browse processing section 132, the layout processing section 134 and the print processing section 136 from the left in a line according to the operational sequence.

The staring display information storage section 106 stores information regarding the display of the large window 40 for the whole application and the small windows 42, 43 and 44 which are displayed in the large window 40 at starting the image processing application shown in FIG. 3. Specifically, the starting display information storage section 106 stores each information such as the number of small windows to be displayed, the display order of the small windows, the size of each small window at starting, the size of the large window, the time difference of displaying the small windows and the number of the small windows which have been displayed. Here, the starting display information storage section 106 stores the number of small window to be displayed "3" in FIG. 26 and FIG. 27. Additionally, the starting display information storage section 106 stores the display order of the small windows that 1. the small window 42 for browse processing, 2. the small window 43 for the layout processing and 3. the small window 44 for the print processing in the order same as the operational sequence of the works.

Here, the starting display information storage section 106 may store a fixed value as "the size of the small windows at starting" and may store the size of each windows 42, 43 and 44 at ending the application at the previous time. Additionally, the starting display information storage section 106 stores the fixed value of the width of frame of the large window surrounding the outline of the small windows as "the size of the large window". Alternatively, the starting display information storage section 106 may store the width of frame of the large window as the ratio to the size of the small windows at starting. Further, the starting display information storage section 106 stores the fixed value such as 0.5 sec. as "the time difference of displaying the small window".

The processing accepting section 120 accepts an instruction from the user 26 to the image processing section 130 through the personal computer 16 and the keyboard 18. The processing accepting section 120 notifies the image processing section 130 of the accepted instruction when the image processing accepting section 120 accepts the instruction.

A recording medium 28 stores a program which causes to operate the display section 100. The program stored on the recording medium 28 is installed in the personal computer 16 to cause the display section 100 to operate. Additionally, the personal computer 16 may acquire such program through a communication line.

Figure 28:
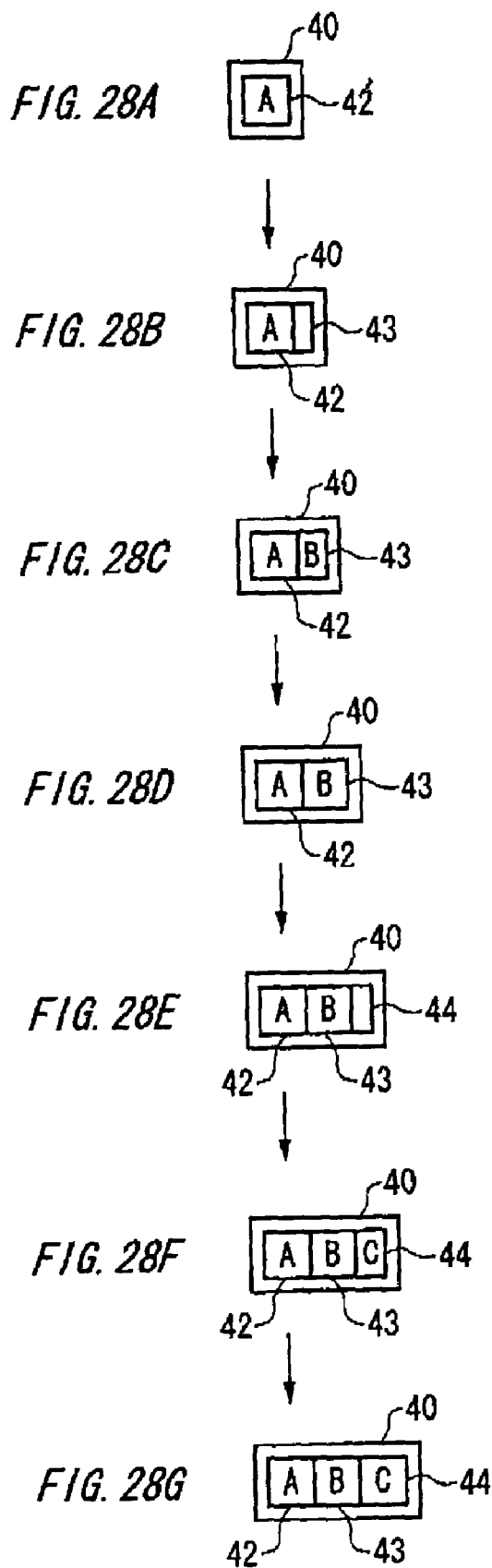
FIG. 28 is a schematic view of the display screen 14 when the image processing application is started.
Figure 29:
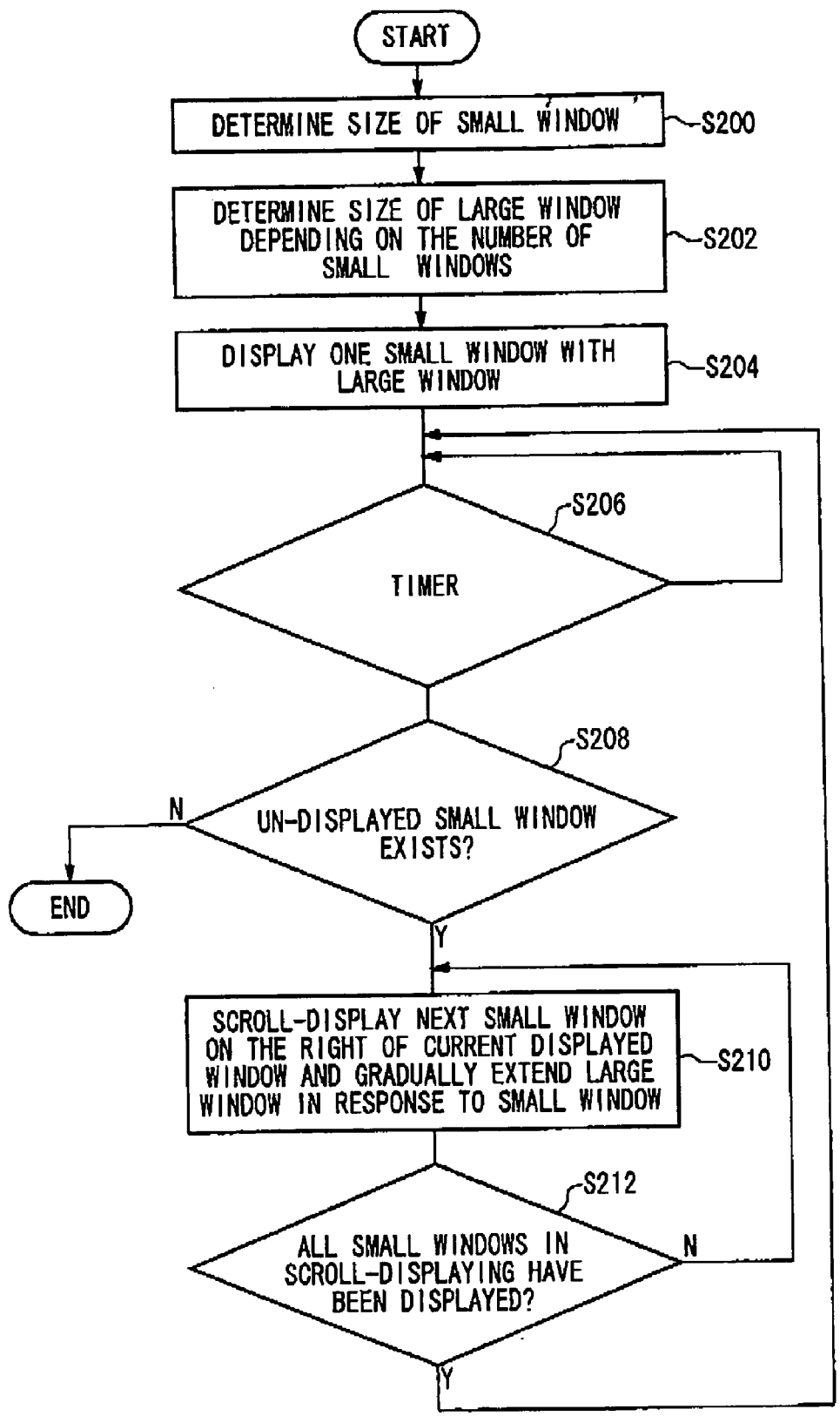
FIG. 29 is a flowchart showing the operation to display the display screen 14 in FIG. 28.

FIG. 28 is a schematic view of the display screen 14 displayed by the display section 100 when the image processing application is started. FIG. 29 is a flowchart showing the operation to display the display screen 14 in FIG. 28.

The flowchart shown in FIG. 29 is started when the starting section 110 notifies of the instruction on starting. Receiving the instruction on starting from the starting section 110, the small window display section 104 of the display section 100 determines the size of the small windows 42, 43 and 44 to be displayed (S200). In this case, the small window display section firstly reads information such as the number of small windows to be displayed, the display order of the small windows, the size of the small windows at starting and the time difference between each small window at displaying when the image processing application is started. Them the small window display section 104 determines the size of each small window 42, 43 and 44 based on the read information. For example, when each size of the small windows at starting is a fixed value, the small window display section 104 determines that the fixed value is the size of the small windows 42, 43 and 44 to be displayed.

Next, the large window display section 102 reads the size of the large window 40 from the starting display information storage section 106 and determines the size of the large window 40 depending on the number of small windows (S202). For example, when the width of frame of the large window is a fixed value, the large window display section 102 fits the outline of the small window determined by the small window display section 104 into the frame having the width (fixed value) to determine the size of the large window 40. In this case, the large window display section 102 determines a plurality of the sizes for the large window depending on the number of the small windows to be sequentially displayed. When the number of windows to be sequentially displayed is 3, for example shown in FIG. 28, the large window display section 102 determines the size of the large window for each case that the number of small windows is 1,2 and 3 as shown in FIGS. 28A, 28D and 29G.

The large window display section 102 and the small window display section 104 display one small window 42 and the large window 40 surrounding the one small window 42 as shown in FIG. 28A (S204), and waits for the time difference read from the starting display information storage section 106 (S206).

Then, the small window display section 104 determines whether there is any small window which has not been displayed (S208). In this case, the small window display section 104 may read the number of small windows which have been displayed from the starting display information storage section 106 and compare the same with the number of small windows to be displayed to determine that there is any small window which has not been displayed. Here, in the present embodiment as shown in FIG. 29, one small window 42 has been displayed in the step S204, so that the starting display information storage section 106 stores the initial value "1" being the number of small window which has been displayed When there is any small window which has not been displayed in the step S208 (S208: Yes), the small window display section 104 scrolls and displays the next small windows which have been displayed from night to left(S210). At the same time, the large window display section 102 gradually extends the large window 40 and displays the same such that the large window fits to and surrounds the small windows 42 and 43 (S210). In this case, the large window display section 102 and the small window display section 104 reads the size of small windows and the large window determined in the steps S200 and S202, and sequentially displays the small windows which has not been displayed from the current display to the display having the read size by the known scroll method. In this case, the large window display section 102 and small window display section 104 scroll (smooth scrolling) a part of small window 43 from the above-described position by pixel of the display screen 14 to display the same.

Next, the small window display section 104 determines whether all the small windows 43 in the scrolling display are displayed (S212). In this case, the small window display section 104 compares the size of the small window 43 currently displayed with the size of the small window determined in the step S200 and determines whether all the small windows 43 are displayed.

When all the small windows 43 in the scrolling display are not displayed (S212: No), return to the step S120, the large window display section 102 and the small window display section 104 continue to scroll and display the small windows 43, and extend the large window 40 in response to the scrolling display of the small windows 43 as shown in FIG. 28C.

When all the small windows 43 in the scrolling display are displayed (S212: Yes) in the step S212, return to the step S206. In this case, the large window display section 102 increases by one the number of small windows which have been displayed and stores the same in the starting display information storage section 106. The large window display section 102 and the small window display section 104 waits for the time difference as holding the state that the small windows 42 and 43 have been displayed as shown in FIG. 28D. Then, the step S208 is performed.

Hereinafter the large window display sections 102 and the small window display section 104 repeat the operation of the step S206—the step S212 until there is no small window which has not been displayed in the same way. Thereby as shown in FIG. 28A-G, the small window display section 104 sequentially add and display the plurality of small windows 42, 43 and 44 in the large window 40 at a predetermined time difference, and the large window display section 102 gradually extends and displays the large window 40 depending on the number of small windows currently displayed.

When there is no small window which has not been displayed in the step S208 (S208: No), the flowchart is ended.

As described above, the small windows 42, 43 and 44 corresponding to each work are sequentially displayed at a predetermined time difference when the application is started, so that each work unit can be clearly presented to the user before operating. Additionally, the small windows 42, 43 and 44 axe displayed in the order same as the operational sequence of a plurality works, so that the operational sequence of the plurality of works can be clearly presented to the user 26 before operating.

Figure 30A:
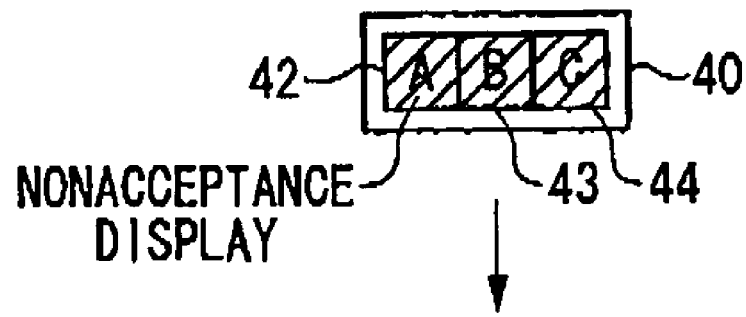
FIG. 30 is a schematic view showing another example of the display screen 14 when the image processing application is started.
Figure 30B:
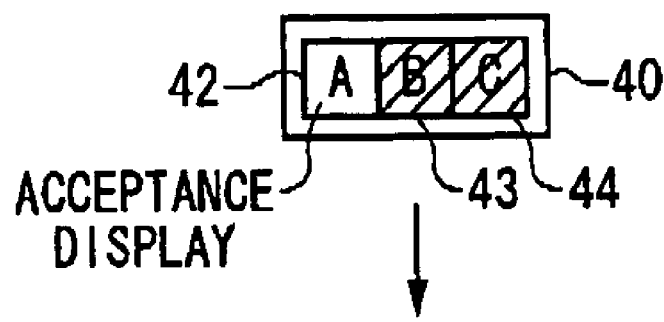
Figure 30C:
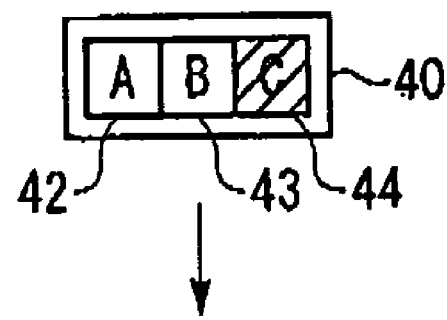
Figure 30D:
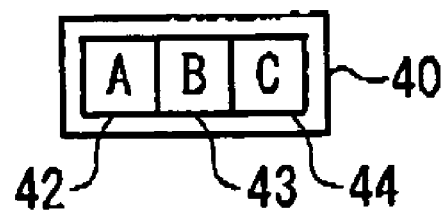
Figure 31:
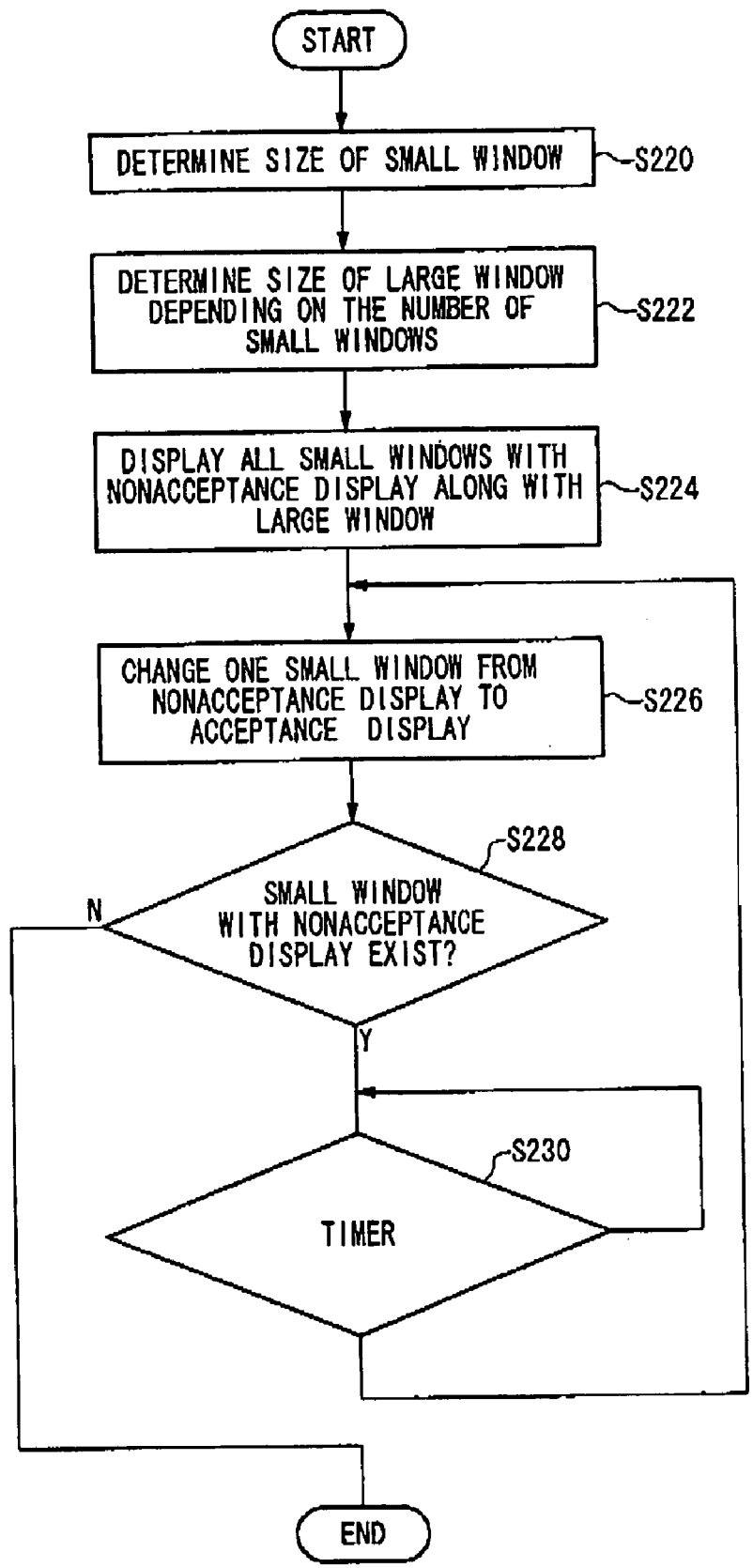
FIG. 31 is a flowchart of the operation to display the display screen in FIG. 30.
Figure 32A:
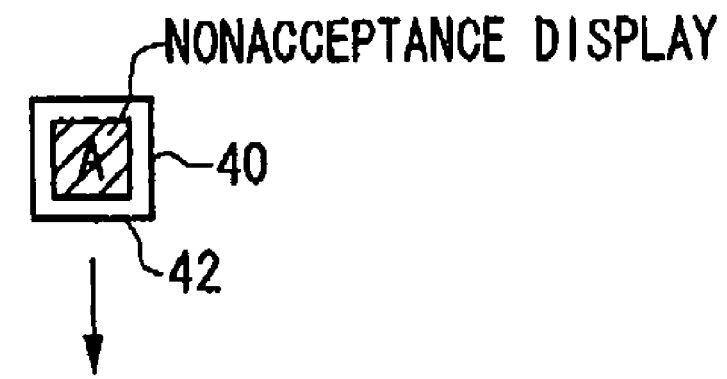
FIG. 32 is a schematic view showing further another example of the display screen 14 when the image processing application is started.
Figure 32B:
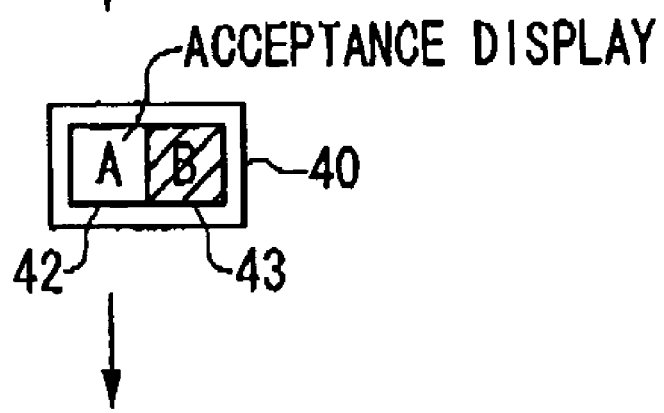
Figure 32C:
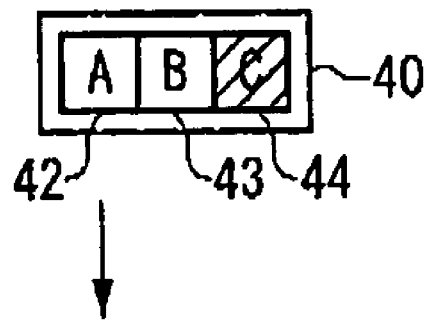
Figure 32D:
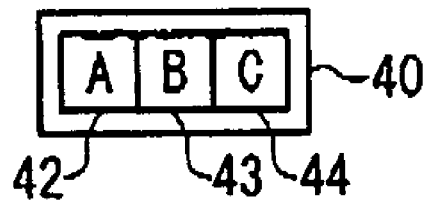
Figure 33A:
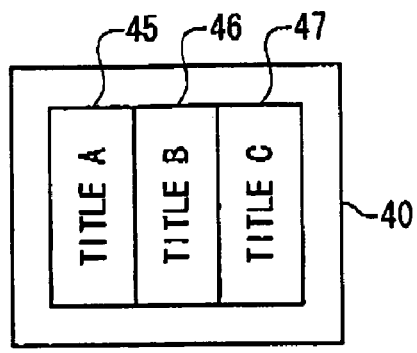
FIG. 33 is a schematic view showing furthermore another example of the display screen 14 when the image processing application is started.
Figure 33B:
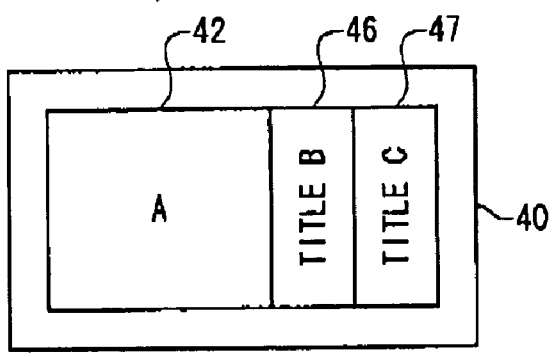
Figure 33C:
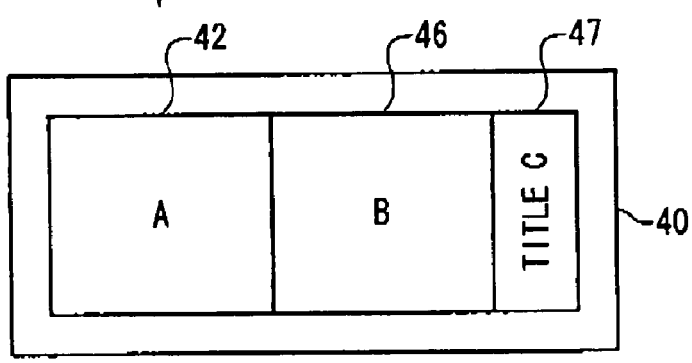
Figure 33D:
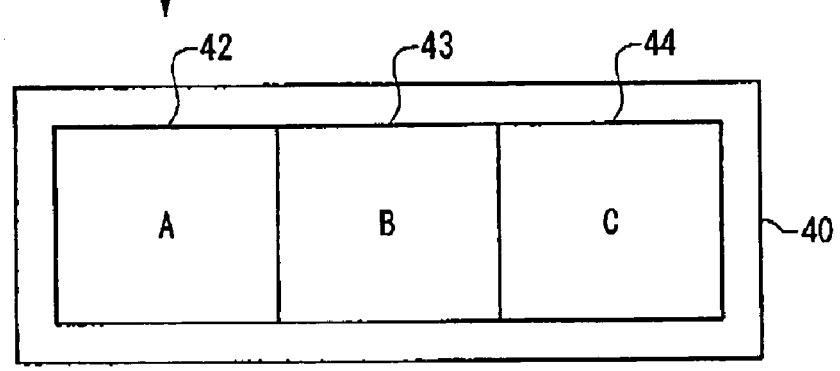

FIG. 30 is a schematic view showing another example of the display screen 14 displayed by the display section 100 when the image processing application is started. FIG. 31 is a flowchart showing the operation of the display section 100 displaying as FIG. 30. Here, the operation of a step S220 in the flowchart shown in FIG. 31 is same as the operation of the step S200 in FIG. 29, so that the description is omitted. Here, the starting display information storage section 106 stores "the number of small windows changed to an acceptance display" as substitute for "the number of small windows which have been displayed" shown in FIG. 29. Here, the starting display information storage section 106 stores "0" as the initial value for the number of small windows changed to the acceptance display.

In a step S222 in FIG. 31, the large window display section 102 reads the size of the large window 40 depending on the number of small windows from the starting display information storage section 106 and determines the size of the large window 40 depending on the number of small windows. In this case, the large window display section 102 determines plurality of sizes for the large window 40 depending on the total number of small windows to be displayed. In FIG. 30, the large window display section 102 determines the size of the large window 40 for which the number of small windows is three in the case that the number of windows to be displayed is three as shown in FIG. 30A The large window display section 102 and the small window display section 104 display the small windows 42, 43 and 44 determined in the step S220 and S222 and the large window 40 surrounding the small windows 42, 43 and 44 as shown in FIG. 30A (S224). In this case, the large window display section 102 displays each of the small windows 42, 43 and 44 with a non-acceptance display indicating that any input from the user 26 is not accepted. Here, an example of the non-acceptance display is to display the small window 42 with achromatic color and grayscale. Additionally, another example of the non-acceptance display is a non-active window display in MS windows (registered trademark).

Next, the small window display section 104 changes one small window 42 from the non-acceptance display to the acceptance display (S226). Here, an example of the acceptance display is to display the small windows 42 with coloring. Additionally, another example of the acceptance display is an active window display in MS windows (registered trademark). Further, the small window display section 104 increases by one the number of the small windows changed to the acceptance state and stores the same in the starting display information storage section 106.

Additionally, the small window display section 104 determines that there is any small window with the non-acceptance display (S228). The determination in the step S228 is same as that in the step 208 in FIG. 29, so that the description is omitted When there is any small window with the non-acceptance in the step S228 (S228: Yes), the large window display section 102 or the small window display section 104 wait for the time difference (S230), and then, return to the step S226. Thereby the large window display section 102 and the small window display section 104 repeat the operation of the step S226—the step S230 until the small windows 42, 43 and 44 which are displayed in the large window 40 at starting indicate the acceptance display as shown in FIG. 30 A-D. Meanwhile when there is no small window with the non-acceptance display in the step S228 (S228: No), the flowchart is ended.

As described above, the small windows 42, 43 and 44 corresponding to each work are sequentially changed from the non-acceptance display to the acceptance display at a predetermined dime difference when the application is started. Therefore, each work unit can be clearly presented to the user 26 before operating. Additionally, since the small windows 42, 43 and 44 are sequentially changed from the non-acceptance display to the acceptance display in the order same as the operational sequence of a plurality of works, the operational sequence of the plurality of works can be clearly presented to the user 26 before operating.

FIG. 32 is a schematic view showing further another example of the display screen 14 displayed by the display section 100 when the image processing application is started.

As shown in FIG. 32A-D, the large window display section 102 displays the large window 40 with the size enough to surround the small windows depending on the number of small windows currently displayed as well as FIG. 28. The small window display section 104 displays a newly added small window to be displayed with a non-acceptance display as well as FIG. 30 and then changes the same to the acceptance display. The operation to display the display screen 14 in FIG. 32 is performed by combining the flowchart of FIG. 29 and the flowchart of FIG. 31, so that the description is omitted As described above, each work wilt can be clearly presented to the user 26 before operating. Additionally, the operational sequence of the plurality of works can be clearly presented to the user before operating.

FIG. 33 is a schematic view showing furthermore another example of the display screen 14 displayed by the display section 100 when the image processing application is started. As shown in FIG. 33A, the small window display section 104 displays the minimized windows 45, 46, 47 being each state that the small window is folded. The large window display section 102 displays the large window 40 with the size enough to surround the minimized windows 45, 46 and 47. In this case, the small window display section 104 may flanker display a title indicative of the processing for the window in the minimized windows 45, 46 and 47. Then, the minimized windows 45, 46 and 47 are sequentially opened to the small windows 42, 43 and 44 according to the order stored in the starting display information storage section 106 as shown in FIG. 33B-D. Here, the large window display section 102 displays the large window 40 enough to surround the small windows according to the opening state of the small windows currently displayed. In this case, the small window display section 104 may gradually open each small window to display the same as shown in FIG. 28, or may change each small window from the minimized state to the opened state to display the same.

As described above, each work unit can be clearly presented to the user 26 before operating. Additionally, the operational sequence of the plurality of works can be clearly presented to the user before operating.

Here, the display at starting is based on the operational sequence of each work in the image processing application in the present embodiment, however the display method at starting is not limited that. For another example, the large window display section 102 may display at starting based on the order corresponding to the importance of each work in the image processing application. Thereby the importance of the plurality works can be clearly presented to the user 26 before operating. In this case, the starting display information storage section 106 may store "the descending order of the importance of works corresponding to the small windows" as substitute for "the display order of the small windows"

Additionally, f the time difference for waiting when each small window has been displayed is equal in the present embodiment, but it is not limited that. For another example, the large window display section 102 may wait for the time difference in association with each small window. In this case, the starting display information storage section 106 may store in association with each small window the time difference for waiting when each small window has been displayed.

Additionally, three small windows 42, 43 and 44 in the image processing application have been described in the present embodiment, however the kind of application is not limited to the image processing application, and the number of small windows may be more than four.

Further, the small windows 42, 43 and 44 arranged crosswise mid sequentially displays in a crosswise direction, however, the direction of displaying at starting is not limited to that. For another example, the small windows may be arranged lengthwise, and may be sequentially displayed in a longitudinal direction at starting.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. A display apparatus for a user interface of an image processing application, the image processing application having a browse processing section for displaying image information, a layout processing section for generating layout information by allocating the image information, and a print processing section for generating printing information to print by a printing device based on the layout information, the display apparatus comprising at least one display device comprising:

an application window display section for displaying a window for the image processing application on a display screens of the at least one display device; and a processing window display section for simultaneously displaying in the window for the image processing application, a window for the browse processing section including displaying the image information, a window for the layout processing section including displaying the layout information, and a window for the print processing section including displaying the printing information, wherein the layout information is dependent on the image information, and the printing information is dependent on the layout information, and the display apparatus for the user interface further comprises a change reflecting section which changes the layout information displayed in the window for the layout processing section and the printing information displayed in the window for the print processing section when the image information is changed in the browse processing section;

wherein the change reflecting section changes the printing information displayed in the window for the print processing section when the layout information is changed in the layout processing section.

2. The display apparatus for the user interface according to claim 1, wherein the change reflecting section generates, when the printing information is changed in the print processing section, a new layout information in the layout processing section based on the changed printing information.

3. The display apparatus for the user interface according to claim 1, wherein the browse processing section has a first subroutine processing section, the layout processing section has a second subroutine processing section, and the print processing has a third subroutine processing section, and the display apparatus for the user interface further comprises a subroutine display section for displaying a new window for a subroutine when a subroutine processing section among the first subroutine processing section, the second subroutine processing section, and the third subroutine processing section is selected, and for closing the window for the subroutine when an end of the selected subroutine processing section is selected.

4. A display method for a user interface of an image processing application having a browse processing section for displaying image information, a layout processing section for generating layout information by allocating the image information, and a print processing section for generating printing information to print by a printing device based on the layout information, the display method comprising:
- displaying a window of the image processing application on a display screen; and
- simultaneously displaying in the window for the image processing application on the display screen, a window for the browse processing section including displaying the image information, a window for the layout processing section including displaying the layout information, and a window for the print processing section including displaying the printing information,
- wherein the layout information is dependent on the image information, and the printing information is dependent on the layout information, and the display method further comprises changing the layout information displayed in the window for the layout processing section and the printing information displayed in the window for the print processing section when the image information is changed in the browse processing sections;
- wherein the changing further comprises changing the printing information displayed in the window for the print processing section when the layout information is changed in the layout processing section.

5. A computer readable recording medium storing a program which executes functions of a display method for a user interface of an image processing application on a computer, the image processing application having a browse processing section for displaying image information, a layout processing section for generating layout information by allocating the image information and a print processing section for generating printing information to print by a printing device based on the layout information, the functions comprising:
- an outer-window display function which displays a window of the image processing application on a display screen; and
- an inner-window display function which simultaneously displays in the window for the image processing application on the display screen, a window for the browse processing section including displaying the image information, a window for the layout processing section including displaying the layout information, and a window for the print processing section including displaying the printing information,
- wherein the layout information is dependent on the image information, and the printing information is dependent on the layout information, and the functions further comprise a change reflecting function which changes the layout information displayed in the window for the layout processing section and the printing information displayed in the window for the print processing section when the image information is changed in the browse processing section;
- wherein the change reflecting function changes the printing information displayed in the window for the print processing section when the layout information is changed in the layout processing section.

* * * * *